US008817079B2

(12) United States Patent
Shimizu

(10) Patent No.: US 8,817,079 B2
(45) Date of Patent: Aug. 26, 2014

(54) IMAGE PROCESSING APPARATUS AND COMPUTER-READABLE RECORDING MEDIUM

(71) Applicant: Fujitsu Limited, Kawasaki (JP)

(72) Inventor: Seiya Shimizu, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 6 days.

(21) Appl. No.: 13/752,741

(22) Filed: Jan. 29, 2013

(65) Prior Publication Data

US 2013/0141547 A1    Jun. 6, 2013

Related U.S. Application Data

(63) Continuation of application No. PCT/JP2010/063426, filed on Aug. 6, 2010.

(51) Int. Cl.
H04N 13/02    (2006.01)

(52) U.S. Cl.
CPC .................. *H04N 13/0242* (2013.01)
USPC ........................................... 348/48

(58) Field of Classification Search
CPC .................................. H04N 13/0242
See application file for complete search history.

(56) References Cited

U.S. PATENT DOCUMENTS 5,850,352 A * 12/1998 Moezzi et al. ................. 345/419
6,369,701 B1    4/2002 Yoshida et al.
2008/0044061 A1 * 2/2008 Hongo ............................ 382/104
2010/0134325 A1    6/2010 Gomi et al.
2011/0095910 A1    4/2011 Takano

FOREIGN PATENT DOCUMENTS

| EP | 2192552 A1 | 6/2010 |
|---|---|---|
| JP | 2002-83284 | 3/2002 |
| JP | 2003-9039 | 1/2003 |
| JP | 2006-253872 | 9/2006 |
| JP | 2009-298178 | 12/2009 |
| JP | 2010-68059 | 3/2010 |
| JP | 2010-128951 | 6/2010 |

OTHER PUBLICATIONS

International Search Report of Corresponding PCT Application PCT/JP2010/063426 mailed Nov. 16, 2010.
Japanese Office Actione issued Nov. 19, 2013 in Japanese Application No. 2012-527527.

* cited by examiner

*Primary Examiner* — Sath V Perungavoor
*Assistant Examiner* — Kate Luo
(74) *Attorney, Agent, or Firm* — Staas & Halsey LLP

(57) ABSTRACT

An image processing apparatus acquires camera images captured by cameras mounted in a vehicle, specifies a position of each pixel of an image lower than a horizontal line among the acquired camera images on a bottom surface of a virtual projection plane that is a hemisphere of an infinite circle with a planar bottom surface, specifies a position of each pixel of an image higher than the horizontal line on a hemisphere surface of the virtual projection plane, specifies a position of a pixel of each camera images specified on the virtual projection plane on a stereoscopic projection plane, specifies each position on an image frame corresponding to the position of the pixel of each camera images specified on the stereoscopic projection plane based on a predetermined point of view position and renders a value of a pixel of a corresponding camera images at each specified position.

5 Claims, 19 Drawing Sheets

| POLYGON ID | APEX ID | POLYGON APEX COORDINATE VALUE | | | IMAGE COORDINATE VALUE | |
|---|---|---|---|---|---|---|
| | | X | Y | Z | S | T |
| 1 | 1 | $x_0$ | $y_0$ | $z_0$ | $S_0$ | $T_0$ |
| | 2 | ... | ... | ... | ... | ... |
| | 3 | ... | ... | ... | ... | ... |
| | 4 | ... | ... | ... | ... | ... |
| 2 | 1 | ... | ... | ... | ... | ... |
| | 2 | ... | ... | ... | ... | ... |
| | 3 | ... | ... | ... | ... | ... |
| | 4 | ... | ... | ... | ... | ... |
| ⋮ | ⋮ | ⋮ | ⋮ | ⋮ | ⋮ | ⋮ |

| STRAIGHT LINE ID | APEX ID | COORDINATE VALUE | |
|---|---|---|---|
| | | X | Y |
| 1 | 1 | $x_1$ | $y_1$ |
| | 2 | $x_2$ | $y_2$ |
| 2 | 1 | ... | ... |
| | 2 | ... | ... |
| ⋮ | ⋮ | ⋮ | ⋮ |

| STRAIGHT LINE ID | APEX ID | 3D COORDINATE VALUE | | |
|---|---|---|---|---|
| | | X | Y | Z |
| 1 | 1 | $x_3$ | $y_3$ | $z_3$ |
| | 2 | $x_4$ | $y_4$ | $z_4$ |
| 2 | 1 | ... | ... | ... |
| | 2 | ... | ... | ... |
| ⋮ | ⋮ | ⋮ | ⋮ | ⋮ |

| REPRESEN-TATIVE POINT ID | COORDINATE VALUE ON ROAD PLANE SURFACE | | 3D COORDINATE VALUE | | |
|---|---|---|---|---|---|
| | X | Y | X | Y | Z |
| 1 | $x_5$ | $y_5$ | $x_6$ | $y_6$ | $z_6$ |
| 2 | ... | ... | ... | ... | ... |
| 3 | ... | ... | ... | ... | ... |
| ⋮ | ⋮ | ⋮ | ⋮ | ⋮ | ⋮ |

| REPRESEN-TATIVE POINT ID | COORDINATE VALUE ON ROAD PLANE SURFACE | | SCREEN COORDINATE VALUE | |
|---|---|---|---|---|
| | X | Y | X | Y |
| 1 | $X_7$ | $Y_7$ | $Y_8$ | $X_8$ |
| 2 | ... | ... | ... | ... |
| 3 | ... | ... | ... | ... |
| ⋮ | ⋮ | ⋮ | ⋮ | ⋮ |

IMAGE PROCESSING APPARATUS AND COMPUTER-READABLE RECORDING MEDIUM

CROSS-REFERENCE TO RELATED APPLICATION

This application is a continuation of International Application No. PCT/JP2010/063426, filed on Aug. 6, 2010 and designating the U.S., the entire contents of which are incorporated herein by reference.

FIELD

The embodiments discussed herein are related to an image processing apparatus and a computer-readable recording medium having stored therein an image processing program.

BACKGROUND

Conventionally, for example, there has been known a technique of generating an overhead view image in which a vehicle is looked down from a virtual point of view based on images captured by a plurality of cameras mounted in the vehicle in order to contribute to vehicle driving assistance. For example, there is a technique of normalizing a plurality of images obtained from a plurality of fish-eye cameras capturing an area around a vehicle and generating an overhead view image in which all areas around the vehicle are looked down from a virtual point of view above the vehicle using the normalized images. Further, for example, there is a technique of generating an overhead view video whose point of view is converted to a video imaged from directly above an own vehicle based on videos imaged by a plurality of camera devices imaging a video around the own vehicle.

In the technique of generating the overhead view image, the overhead view image in which all areas around the vehicle are looked down is generated by projecting camera videos on a plane surface corresponding to a road surface. For this reason, for example, an image may be distorted at the position away from a vehicle as illustrated in FIG. 27. FIG. 27 is a diagram illustrating an example of an overhead view image in which all areas around a vehicle are looked down.

On the other hand, there has been known a technique in which an omnidirectional image whose virtual point of view can be arbitrarily changed is generated by synthesizing camera images acquired by a plurality of cameras installed around a vehicle. In the omnidirectional image, since a projection plane of a camera image is stereoscopic, distortion of an object present at the position away from the camera, that is, at the position away from the vehicle is smaller than in the overhead view image whose projection plane of a camera image is a plane surface. Thus, in the omnidirectional image, the position away from the vehicle can be more clearly checked than in the overhead view image, and so the omnidirectional image may be more useful to the vehicle driving assistance.

Patent Literature 1: Japanese Laid-open Patent Publication No. 2006-253872
Patent Literature 2: Japanese Laid-open Patent Publication No. 2009-298178

Meanwhile, in the omnidirectional image, images of a plurality of cameras are synthesized. Thus, an object captured in an area within a common capturing range of a plurality of cameras, that is, an overlapping area is included in a plurality of camera images. For example, when cameras are installed at four positions, that is, the front, the rear, the left, and the right of the vehicle, there is a difference of several meters between installation positions of cameras. The difference between installation positions of cameras causes parallax between camera images, and thus the following problem occurs in the overlapping area of a plurality of cameras on the omnidirectional image. For example, when two camera images are synthesized on the overlapping area, one object is viewed as two objects since the object is projected at a plurality of positions on the projection plane. In addition, when, of two camera images, an image to be employed on the overlapping area is decided by a certain line on the omnidirectional image, an object present across the line, for example, road surface paint, is viewed in a broken state.

SUMMARY

According to an aspect of an embodiment, an image processing apparatus includes a memory and a processor coupled to the memory. The processor executes a process including acquiring camera images, respectively, captured by a plurality of cameras which are mounted in a vehicle and have partially overlapping subject regions, specifying a position of each pixel of an image lower than a horizontal line obtained from an installation position and an angle of a camera among the acquired camera images on a bottom surface of a virtual projection plane that is a hemisphere of an infinite circle with a planar bottom surface, and specifying a position of each pixel of an image higher than the horizontal line among the acquired camera images on a hemisphere surface of the virtual projection plane, specifying a position of a pixel of each camera images specified on the virtual projection plane on a stereoscopic projection plane having a stereoscopic shape having a position of the vehicle as a center, and specifying each position on an image frame corresponding to the position of the pixel of each camera images specified on the stereoscopic projection plane based on a predetermined point of view position and rendering a value of a pixel of a corresponding camera images at each specified position.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings.

The technique of the present disclosure is not limited to embodiments which will be described later as the exemplary embodiments of an image processing apparatus and an image processing program according to the present disclosure.

[a] First Embodiment

Configuration of Image Processing Apparatus

Figure 1:
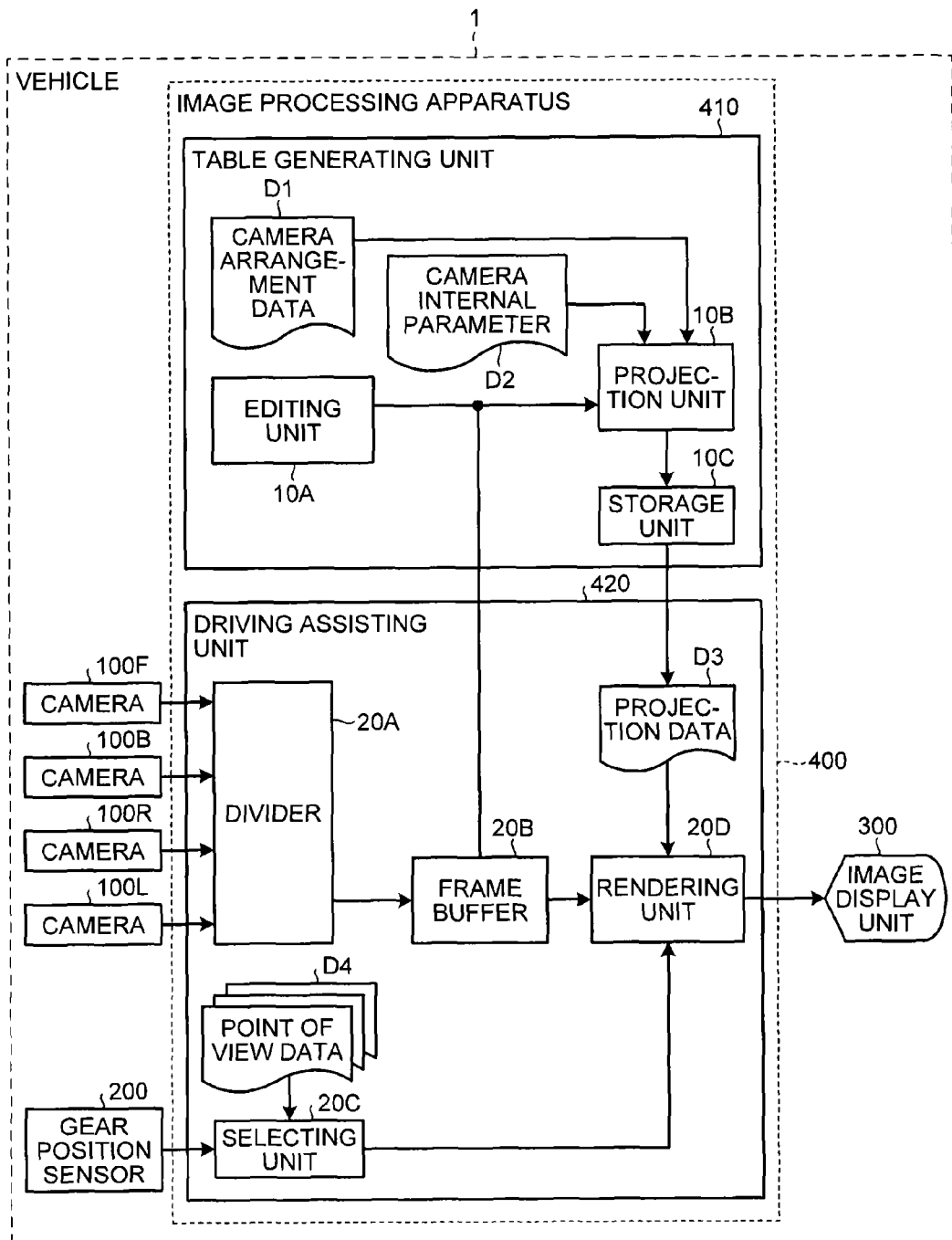
FIG. 1 is a functional block diagram illustrating a configuration of an image processing apparatus according to a first embodiment.

FIG. 1 is a functional block diagram illustrating a configuration of an image processing apparatus according to a first embodiment. As illustrated in FIG. 1, cameras 100F, 100B, 100R, and 100L, a gear position sensor 200, an image display unit 300, and an image processing apparatus 400 are mounted in a vehicle 1.

The cameras 100F, 100B, 100R, and 100L are cameras with a wide-angle lens such as a fish-eye lens, and installed at predetermined positions of the vehicle 1 to capture a video of an area around the vehicle 1. The cameras 100F, 100B, 100R, and 100L are installed in the vehicle 1 such that subject regions of neighboring cameras partially overlap each other, and a video of a road surface and a road side of a 360 degree around the vehicle 1 is captured by all cameras.

Figure 2:
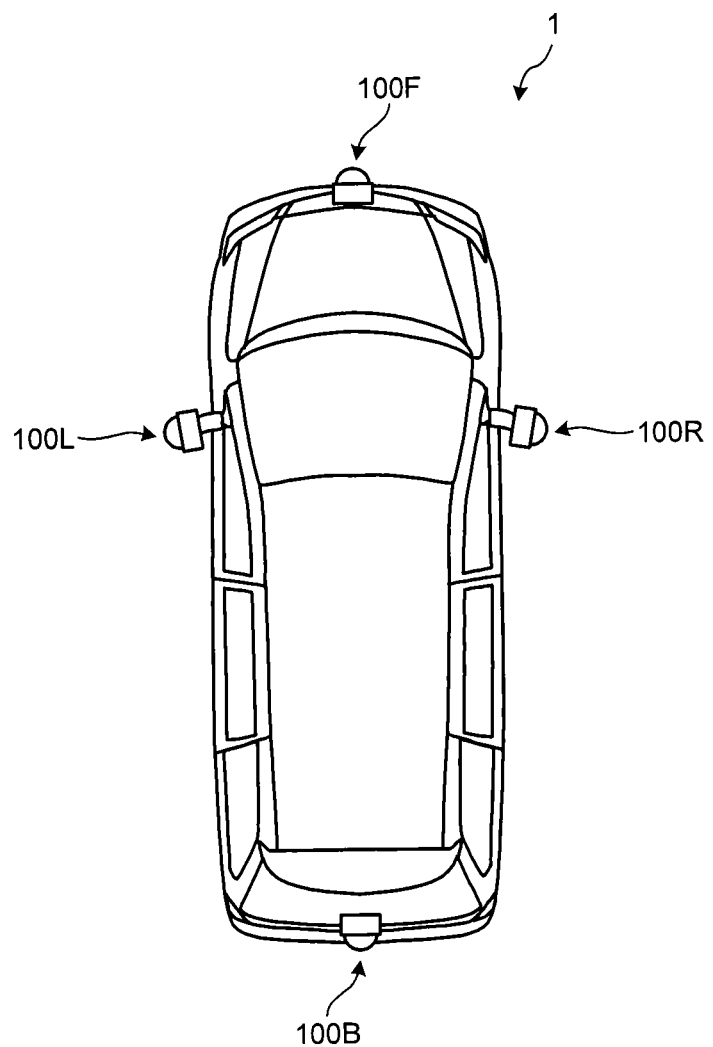
FIG. 2 is a diagram illustrating an example of a camera installation position according to the first embodiment.

FIG. 2 is a diagram illustrating an example of a camera installation position according to the first embodiment. As illustrated in FIG. 2, the camera 100F is installed on the front portion of the vehicle 1, the camera 100B is installed on the rear portion of the vehicle 1, the camera 100R is installed on the right side of the vehicle 1, and the camera 100L is installed on the left side of the vehicle 1. The cameras 100F, 100B, 100R, and 100L transmit captured images to a divider 20A (which will be described later) via signal lines as a video signal that conforms to a national television system committee (NTSC) or the like.

The gear position sensor 200 acquires information of a gear position of the vehicle 1, and transfers the acquired information to the image processing apparatus 400.

The image display unit 300 includes an output device such as a display or a monitor, and displays an omnidirectional image generated based on the camera images acquired by the cameras 100F, 100B, 100R, and 100L. The image display unit 300 may include an input device such as a touch panel and implement a pointing device function.

The image processing apparatus 400 includes a table generating unit 410 and a driving assisting unit 420 as illustrated in FIG. 1.

The table generating unit 410 generates a table used to render a three-dimensional (3D) omnidirectional image that displays all areas around the vehicle 1 using the camera images captured by the cameras 100F, 100B, 100R, and 100L. As illustrated in FIG. 1, the table generating unit 410 includes an editing unit 10A, a projection unit 10B, and a storage unit 100.

Figure 3:
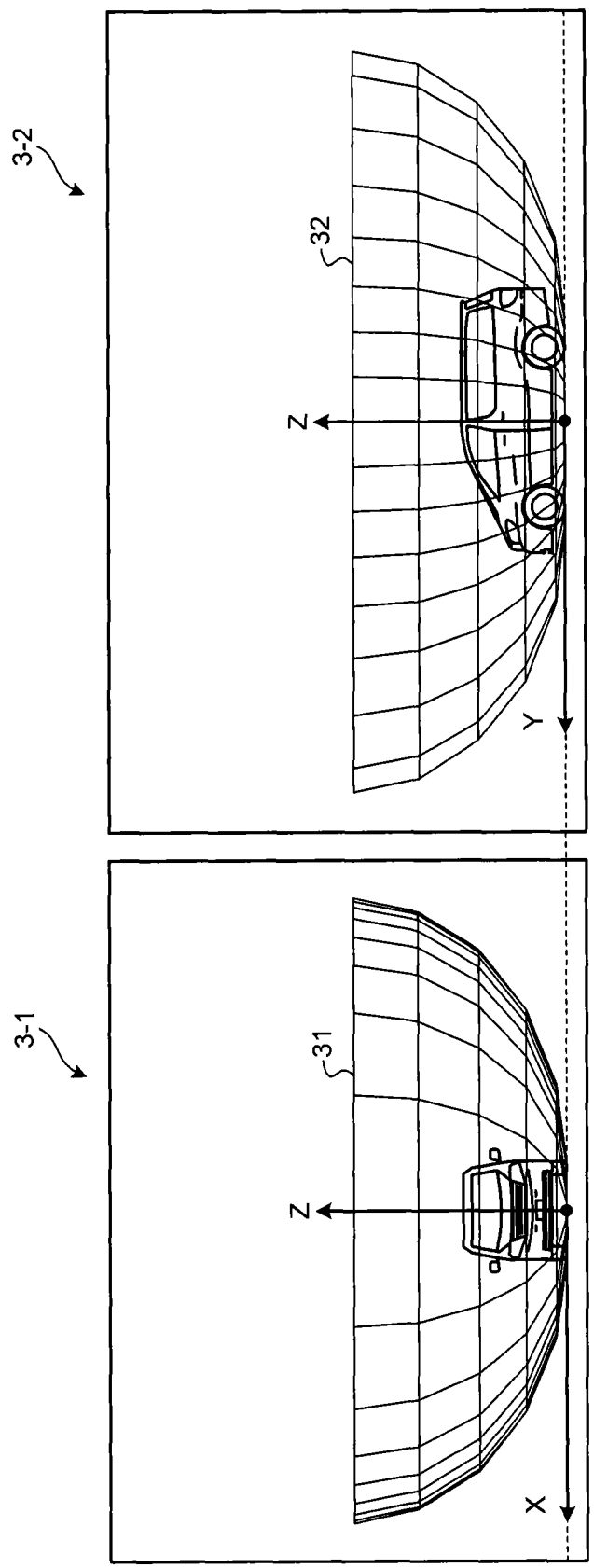
FIG. 3 is a diagram illustrating the shape of a stereoscopic projection plane used in the first embodiment.

The editing unit 10A decides the shape of a stereoscopic projection plane to generate the omnidirectional image. FIG. 3 is a diagram illustrating the shape of the stereoscopic projection plane used in the first embodiment. 3-1 of FIG. 3 illustrates the shape of the stereoscopic projection plane viewed from the front of the vehicle 1. 3-2 of FIG. 3 illustrates the shape of the stereoscopic projection plane viewed from the left side of the vehicle 1. The editing unit 10A decides the stereoscopic curved surface having the shape such as 31 illustrated in 3-1 of FIG. 3 or 32 illustrated in 3-2 of FIG. 3 as the shape of the stereoscopic projection plane, which centers the position of the vehicle 1, and which can approximate the road plane surface in an area around the vehicle 1 and increases a gradient as the distance from the vehicle 1 increases. The editing unit 10A can decide the shape of the stereoscopic projection plane by a mathematical formula or a polyhedron shape.

The projection unit 10B calculates a correspondence relation representing the position in which each pixel of the camera images captured by the cameras 100F, 100B, 100R, and 100L is to be projected on the stereoscopic projection plane using a camera arrangement data D1 and a camera internal parameter D2. The projection unit 10B is an example of a first specifying unit and a second specifying unit.

For example, the projection unit 10B divides the stereoscopic projection plane decided by the editing unit 10A into polyhedrons. Then, the projection unit 10B obtains a correspondence relation by associating apex coordinates of a polygon forming the polyhedron with coordinate value of a pixel on each camera image to be projected on the position of the apex coordinates of the polygon using the virtual point of view projection. The apex coordinates of the polygon is 3D coordinates defined by a vehicle coordinate system, and the coordinate value of the pixel on each camera image is a two-dimensional coordinate defined by an image coordinate system.

The vehicle coordinate system is a coordinate system in which a Y axis represents a moving direction of the vehicle 1, a Z axis represents a vertical direction of the vehicle 1, and an X axis represents a horizontal direction that forms a right-handed system with the Y and Z axes. An original point of the vehicle coordinate system is set to an intersection point between a normal line that is directed from the center of the vehicle 1 toward the road plane surface and the road plane surface. The image coordinate system is a coordinate system on a tetrameric image obtained by synthesizing the camera images captured by the cameras 100F, 100B, 100R, and 100L through the divider 20A (which will be described later).

Next, a method of calculating the correspondence relation between the apex coordinates of the polygon and the coordinates of each camera image by the projection unit 10B will be described with reference to FIGS. 4 to 8. Since the correspondence relation on each camera image is calculated by the same method, the description will proceed using a method of calculating the correspondence relation between the apex coordinates of the polygon and the coordinates of the camera image captured by the camera 100B as an example.

Figure 4:
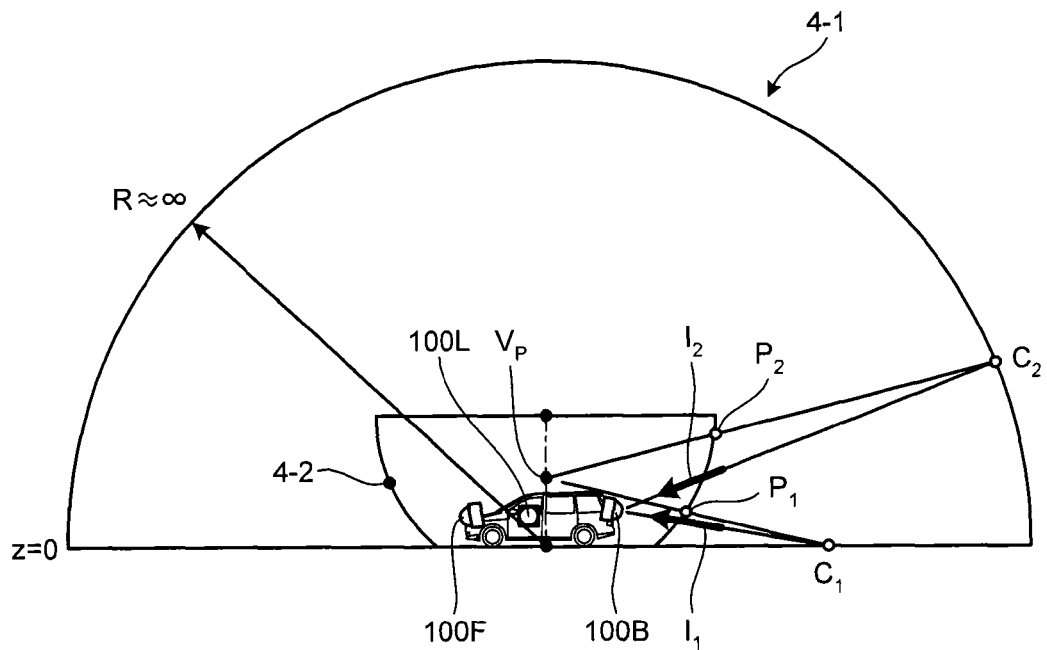
FIG. 4 is a diagram for describing virtual point of view projection used in the first embodiment.
Figure 5:
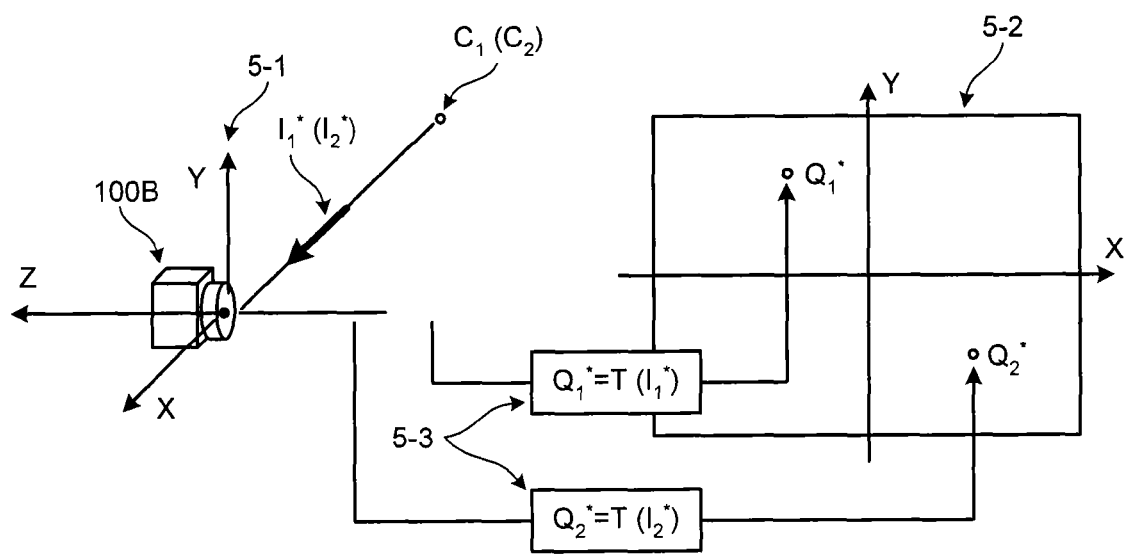
FIG. 5 is a diagram used to describe a calculation method of a correspondence relation between apex coordinates of a polygon and coordinates of each camera image according to the first embodiment.

FIG. 4 is a diagram for describing virtual point of view projection used in the first embodiment. 4-1 of FIG. 4 illustrates a virtual point of view projection plane having the shape in which a hemisphere having the center at an original point of a vehicle coordinate system and having a radius of a sufficiently large distance as infinity at Z>0 is combined with a road plane surface. The sufficiently large distance is preferably a large value in which the distance between cameras is regarded as an error. The sufficiently large distance may be a finite numerical value when the finite numerical value is sufficiently larger than the distance between cameras that causes parallax, that is, several meters. For example, 10 km is considered as the sufficiently large distance. 4-2 of FIG. 4 represents the stereoscopic projection plane illustrated in FIG. 3 described above. FIG. 5 is a diagram used to describe a calculation method of the correspondence relation between the apex coordinates of the polygon and the coordinates of each camera image according to the first embodiment. 5-1 of FIG. 5 illustrates the camera coordinate system of the camera 100B, 5-2 of FIG. 5 illustrates a local image which is a camera image captured by the camera 100B, and 5-3 of FIG. 5 illustrates a formula for converting an incident light vector of the camera coordinate system into a pixel position of the local image.

First, the projection unit 10B decides one virtual point of view $V_p$ serving as a reference used to generate an omnidirectional image near the vehicle 1 as illustrated in FIG. 4. Next, the projection unit 10B obtains an intersection point $C_1$ with a virtual point of view projection plane by extending a line segment that connects the position of the virtual point of view $V_p$ with the polygon apex $P_1$ on the stereoscopic projection plane 4-2. Similarly, the projection unit 10B obtains an intersection point $C_2$ with a virtual point of view projection plane by extending a line segment that connects the position of the virtual point of view $V_p$ with the polygon apex $P_2$ on the stereoscopic projection plane 4-2. As illustrated in FIG. 4, the intersection point $C_1$ is positioned on the road plane surface portion of the virtual point of view projection plane, and the intersection point $C_2$ is positioned on the hemisphere portion of the virtual point of view projection plane. Next, the projection unit 10B obtains an incident light vector $I_1$ of the vehicle coordinate system that is directed from the intersection point $C_1$ toward the camera 100B and an incident light vector $I_2$ of the vehicle coordinate system that is directed from the intersection point $C_2$ toward the camera 100B, respectively, for example, as illustrated in FIG. 4.

Next, the projection unit 10B converts the incident light vectors that are directed toward the camera 100B obtained by the vehicle coordinate system, for example, $I_1$ and $I_2$ illustrated in FIG. 4 into the incident light vectors of the camera coordinate system, for example, $I_1^*$ and $I_2$ illustrated in FIG. 5, respectively. A method of converting the incident light vector from the vehicle coordinate system to the camera coordinate system will be described below.

Figure 6:
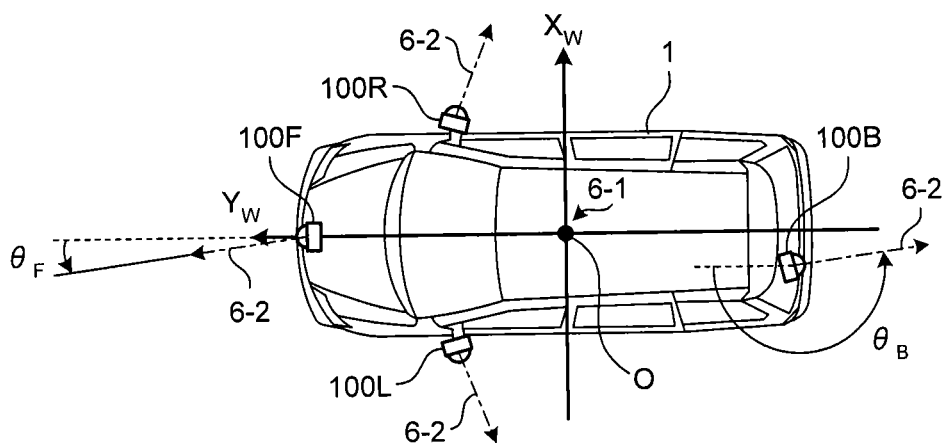
FIG. 6 is a diagram illustrating an example of a camera parameter used in the first embodiment.
Figure 7:
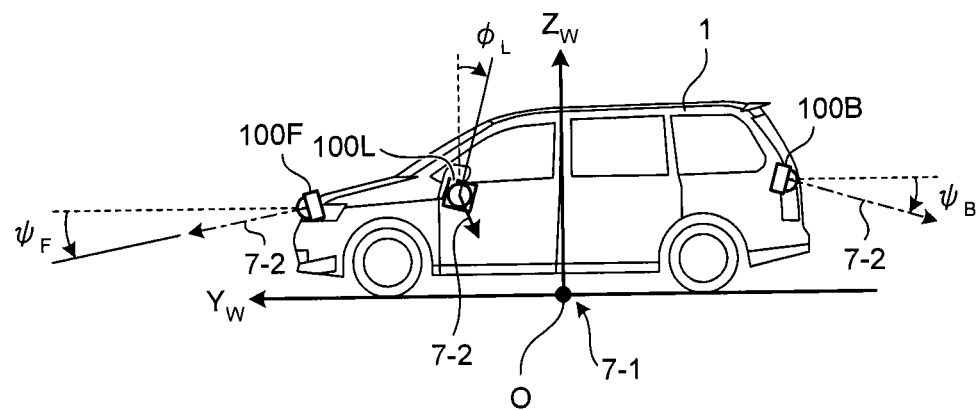
FIG. 7 is a diagram illustrating an example of a camera parameter used in the first embodiment.

FIGS. 6 and 7 are diagrams illustrating examples of camera parameters used in the first embodiment. FIG. 6 illustrates a state in which the vehicle 1 is vertical looked down from above. FIG. 7 illustrates a state in which the vehicle 1 is viewed from the left side. 6-1 illustrated in FIGS. 6 and 7-1 illustrated in FIG. 7 represent the vehicle coordinate system having an original point O. $\theta_F$ and $\theta_B$ illustrated in FIG. 6 and $\psi_F$, $\psi_B$, and $\phi_L$ illustrated in FIG. 7 represent angle parameters that depend on mounting angles 6-2 and 7-2 of cameras in the vehicle coordinate system. Although not illustrated in FIG. 6 and FIG. 7, a position parameter that depends on the mounting position of a camera in the vehicle coordinate system is represented by 3D coordinates including, for example, (X coordinate: xw, Y coordinate: yw, Z coordinate: zw). The angle parameter and the position parameter of the camera correspond to the camera arrangement data D1 illustrated in FIG. 1.

For example, the projection unit 10B uses "$C_1=(C_1x, C_1y, C_1z)$" as the coordinates of the intersection point $C_1$ obtained by the vehicle coordinate system. Further, the projection unit 10B obtains coordinates "$C_1=(C_1^*x, C_1^*y, C_1^*z)$" of the position $C_1^*$ of the camera coordinate system corresponding to the coordinates "$C_1=(C_1x, C_1y, C_1z)$" of the intersection point $C_1$ using the following Formulas 1 to 9.

$$\begin{bmatrix} C^*x \\ C^*y \\ C^*z \\ 1 \end{bmatrix} = \quad (1)$$

$$\begin{bmatrix} m11 & m21 & m31 & -m11 \times xw - m12 \times yw - m12 \times zw \\ m12 & m22 & m32 & -m21 \times xw - m22 \times yw - m22 \times zw \\ m13 & m23 & m33 & -m31 \times xw - m32 \times yw - m32 \times zw \\ 0 & 0 & 0 & 1 \end{bmatrix} \begin{bmatrix} Cx \\ Cy \\ Cz \\ 1 \end{bmatrix}$$

$$m11 = \cos\phi \times \cos\theta - \sin\phi \times \sin\psi \times \sin\theta \quad (2)$$

$$m12 = \cos\phi \times \sin\theta + \sin\phi \times \sin\psi \times \cos\theta \quad (3)$$

$$m13 = \sin\phi \times \cos\psi \quad (4)$$

$$m21 = -\sin\phi \times \cos\theta - \cos\phi \times \sin\psi \times \sin\theta \quad (5)$$

$$m22 = -\sin\phi \times \sin\theta + \cos\phi \times \sin\psi \times \cos\theta \quad (6)$$

$$m23 = \cos\phi \times \cos\psi \quad (7)$$

$$m31 = \cos\psi \times \sin\theta \quad (8)$$

-continued $$m32 = -\cos\psi \times \cos\theta \quad (9)$$

Similarly, the projection unit 10B uses, for example, "$C_2=(C_2x, C_2y, C_2z)$" as the coordinates of the intersection point $C_2$ obtained in the vehicle coordinate system. Further, the projection unit 10B obtains coordinates "$C_2^*=(C_2^*x, C_2^*y, C_2^*z)$" of the position $C_2^*$ of the camera coordinate system corresponding to the coordinates of the intersection point $C_2$.

Next, the projection unit 10B converts the incident light vector $I_1$ that is directed toward the camera 100B obtained in the vehicle coordinate system into the incident light vector $I_1^*$ of the camera coordinate system using the position $C_1^*$ of the camera coordinate system. Similarly, the projection unit 10B converts the incident light vector $I_2$ that is directed toward the camera 100B obtained in the vehicle coordinate system into the incident light vector $I_2^*$ of the camera coordinate system using the position $C_2^*$ of the camera coordinate system.

Next, for example, the projection unit 10B obtains a local pixel position $Q_1^*$ of the camera image captured by the camera 100B based on the incident light vector $I_1^*$ of the camera coordinate system using a function "T" of 5-3 illustrated in FIG. 5. Similarly, the projection unit 10B obtains a local pixel position $Q_2^*$ of the camera image captured by the camera 100B based on the incident light vector of the camera coordinate system using the function "T." The function "T" may be uniquely decided based on the camera internal parameter illustrated in FIG. 1, for example, lens distortion data, and may be implemented by generating a table T of a local pixel position on an incident light vector in advance.

Figures 8, 9:
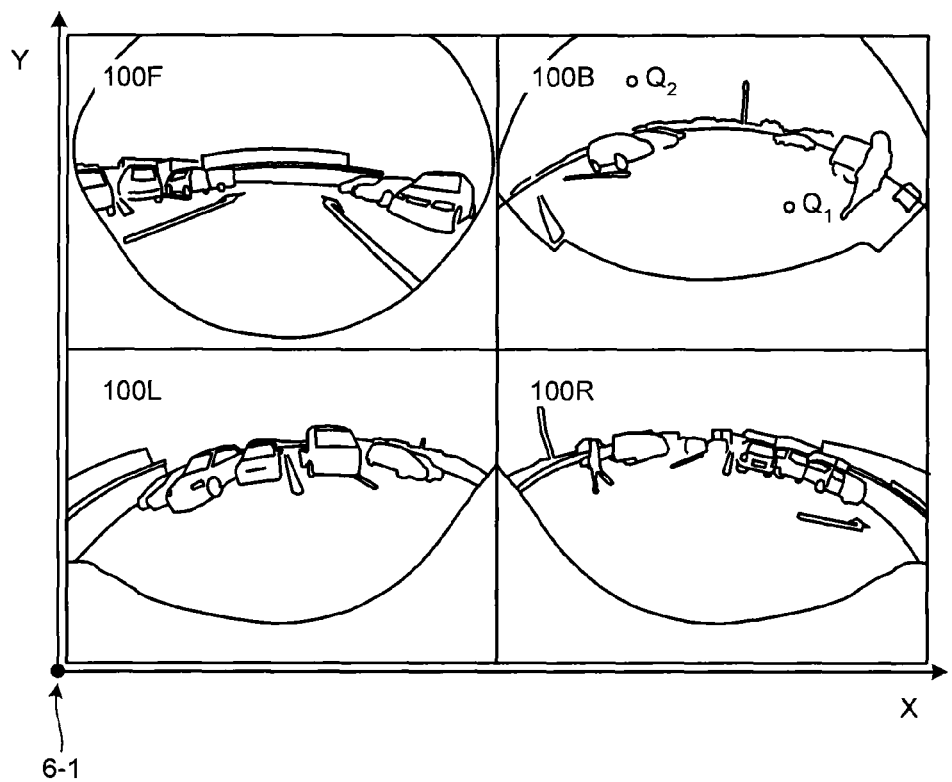
FIG. 8 is a diagram illustrating a camera image described in the first embodiment.
FIG. 9 is a diagram illustrating an example of information stored in a storage unit 100.

Next, the projection unit 10B obtains positions $Q_1$ and $Q_2$ of the image coordinate system on the local pixel positions $Q_1^*$ and $Q_2^*$ of the camera image captured by the camera 100B, respectively. FIG. 8 is a diagram illustrating a camera image described in the first embodiment. As illustrated in FIG. 8, in the first embodiment, one tetrameric image is synthesized from the camera images captured by the cameras 100F, 100B, 100R, and 100L through the divider 20A which will be described later. The positions $Q_1$ and $Q_2$ of the image coordinate system described above correspond to the positions of the pixels of the image coordinate system corresponding to this tetrameric image. For example, the projection unit 10B obtains the position $Q_1$ of the image coordinate system corresponding to the local pixel position $Q_1^*$ as illustrated in FIG. 8 by adding an offset volume specific to the camera 100B to the local pixel position $Q_1^*$ of the camera image captured by the camera 100B. Similarly, the projection unit 10B obtains the position $Q_2$ of the image coordinate system corresponding to the local pixel position $Q_2^*$, for example, as illustrated in FIG. 8 by adding the offset volume specific to the camera 100B to the local pixel position $Q_2^*$ of the camera image captured by the camera 100B.

The projection unit 10B can calculate the correspondence relation between the apex coordinates of the polygon and the coordinates of the camera images by the above-described method, and can calculate a plurality of image coordinate values when a plurality of cameras capable of capturing the incident light vector $I_1$ or $I_2$ are present. This is because the subject region of the cameras, that is, the capturing ranges of the cameras partially overlap between the cameras. In this regard, in this case, a single camera capable of capturing all apexes belonging to a polygon including a corresponding apex is selected, and an image coordinate value thereof is used. Further, when a plurality of cameras capable of capturing all apexes belonging to the polygon are present, a polygon at the position closer to the original point of the coordinate system of the local image, that is, the original point of the coordinate system defining the local pixel position illustrated in 5-2 of FIG. 5, and an the image coordinate value thereof is used.

The projection unit 10B stores a correspondence relation between a coordinate value of an apex of each polygon on the stereoscopic projection plane in the vehicle coordinate system and a coordinate value of each camera image in the image coordinate system in the storage unit 10C.

As described above, the projection unit 10B calculates the correspondence relation between the apex coordinates of the polygon and the coordinates of the camera images using the virtual point of view projection. As described above, the image coordinate value corresponding to the coordinate value on the stereoscopic projection plane is calculated using the virtual point of view projection, and thus influence of the parallax between the cameras is reduced when videos captured by different camera positions are projected on the stereoscopic projection plane. Since the intersection point $C_2$ is present at the position regarded as the infinite point, a difference between camera positions does not need to be considered, and thus the incident light vector $I_2$ illustrated in FIG. 4 is treated as the same incident light vector in all cameras. In other words, the distance between the cameras can be regarded as an error with respect to the distance from each camera to the intersection point $C_2$ regarded as the infinite point. Thus, light from a subject at the position $C_2$ becomes the incident light vector $I_2$ in the vehicle coordinate system regardless the capturing camera, and is projected on one point of the apex $P_2$ in the stereoscopic projection plane. In other words, the pixel that becomes the incident light vector $I_2$ in the vehicle coordinate system is projected on the apex $P_2$ in videos of all cameras. For this reason, when the subject that becomes the incident light vector $I_2$ is present at an infinite distance or a sufficiently long distance, the subject projected on the stereoscopic projection plane is less affected by the parallax between the cameras and mapped on the point $P_2$. Meanwhile, the incident light vector $I_1$ that intersects with the plane surface of Z=0 at the intersection point $C_1$ illustrated in FIG. 4 is at a sufficiently short distance and becomes a vector that differs according to a camera. In other words, light from the subject at the position $C_1$ on the road is recorded as the incident light vector $I_1$ that differs according to a camera. However, an extension of an incident light vector of each camera from each camera in a reverse direction always intersects with one point $C_1$, and is projected on the $P_1$ in the stereoscopic projection plane. For this reason, the video of the subject present on the road surface is mapped on the point $P_1$ without influence of the parallax between the cameras. In the video captured by a vehicle camera, the road surface is likely to be appeared at the position of Z=0, and a subject at a distant position is likely to be appeared above a horizontal surface at the time of driving. Thus, an omnidirectional image in which influence of the parallax is reduced as a whole is synthesized by projecting each camera image on the hemisphere of the infinite circle illustrated in 4-1 of FIG. 4.

The storage unit 100 stores a projection data table describing the correspondence relation between the coordinate value of the apex of each polygon on the stereoscopic projection plane stored by the projection unit 10B and the coordinate value of each camera image. The storage unit 100 stores an ID assigned to each polygon on the stereoscopic projection plane, each apex ID assigned to each apex of a polygon, a polygon apex coordinate value (X,Y,Z), and an image coordinate value (S,T) in association with one another. FIG. 9 is a diagram illustrating an example of information stored in the storage unit 100. For example, the storage unit 100 stores a polygon ID "1," apex IDs "1" to "4," a polygon apex coordinate value "$x_0,y_0,z_0$," and an image coordinate value "$S_0,T_0$" in association with one another as illustrated in FIG. 9. For example, the storage unit 10C is a semiconductor memory device such as a random access memory (RAM) or a flash memory.

The driving assisting unit 420 will be described with reference back to FIG. 1. The driving assisting unit 420 includes a divider 20A, a frame buffer 20B, a selecting unit 20C, and a rendering unit 20D as illustrated in FIG. 1.

The divider 20A acquires the camera images captured by the cameras 100F, 100B, 100R, and 100L, synthesizes one tetrameric image from the acquired images as illustrated in FIG. 8, and stores the tetrameric image in the frame buffer 20B. The divider 20A is an example of an acquiring unit. The frame buffer 20B accumulates the tetrameric image stored by the divider 20A.

The selecting unit 20C decides a point of view position when an image is rendered by the rendering unit 20D which will be described later based on information of the gear position acquired from the gear position sensor 200. The selecting unit 20C may dynamically decide the point of view position based on information such as a handle steering angle or speed or information of various kinds of sensors mounted in the vehicle 1 rather than information of the gear position, and the point of view position may be designated to a fixed value in advance.

The rendering unit 20D generates an omnidirectional image by rendering a pixel value of a corresponding tetrameric image onto a pixel position on a display image frame based on the point of view position decided by the selecting unit 20C using a 3D computer graphics (CG) technique. The rendering unit 20D is an example of a rendering unit.

For example, the rendering unit 20D acquires the projection data table from the storage unit 10C of the table generating unit 410. Next, the rendering unit 20D sets a texture coordinate obtained by normalizing an image coordinate value on a polygon shape of the stereoscopic projection plane based on projection data D3 described in the projection data table. Next, the rendering unit 20D generates an omnidirectional image by performing polygon rendering with a video texture by perspective projection or parallel projection from the point of view position decided by the selecting unit 20C using each camera image updated in 30 frames per second as the video texture. The rendering unit 20D may be implemented by hardware based on a standard 3D graphics LSI or software based on an OpenGL which is a standard 3D graphics library.

The image display unit 300 displays the omnidirectional image generated by the rendering unit 20D.

Processing by Image Processing Apparatus (First Embodiment)

Figure 10:
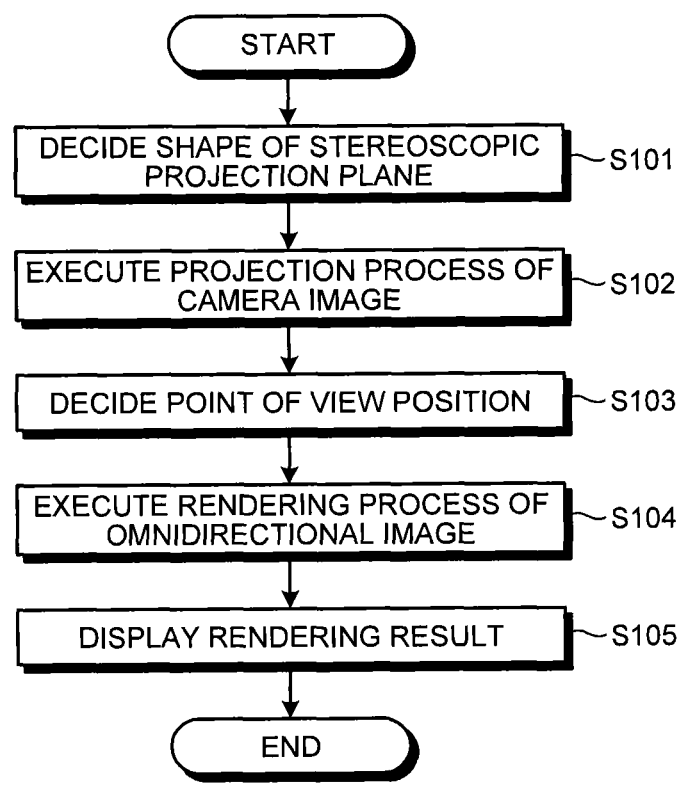
FIG. 10 is a diagram illustrating the flow of a process by an image processing apparatus according to the first embodiment.

FIG. 10 is a diagram illustrating the flow of a process by an image processing apparatus according to the first embodiment. Referring to FIG. 10, the editing unit 10A decides the shape of the stereoscopic projection plane to generate an omnidirectional image (step S101). Next, the projection unit 10B executes a projection process of a camera image (step S102). The projection process corresponds to a process of calculating the correspondence relation representing the position in which each pixel of the camera images captured by the cameras 100F, 100B, 100R, and 100L is projected on the stereoscopic projection plane.

Next, the selecting unit 20C decides the point of view position when an image is rendered by the rendering unit 20D based on information of the gear position acquired from the gear position sensor 200 (step S103). Next, the rendering unit 20D executes a rendering process of an omnidirectional image based on the decided point of view position (step S104). The rendering process corresponds to a process of generating an omnidirectional image by rendering a pixel value of a corresponding tetrameric image onto a pixel position on the display image frame.

Next, the image display unit 300 displays a rendering result by the rendering unit 20D, that is, an omnidirectional image (step S105), and ends the process.

The process of steps S101 to S105 illustrated in FIG. 10 may be executed at an arbitrary timing when a device is online, and the process of steps S101 and S102 illustrated in FIG. 10 may be executed at an arbitrary timing when a device is offline.

Effects of First Embodiment

As described above, the image processing apparatus 400 according to the first embodiment calculates the correspondence relation representing the position in which each pixel of each camera image is projected on the stereoscopic projection plane using the virtual point of view projection, and generates an omnidirectional image using the correspondence relation. Thus, according to the first embodiment, an omnidirectional image in which influence of the parallax between the camera images is reduced can be generated.

Further, the first embodiment has been described in connection with an example in which the table generating unit 410 disposed in the image processing apparatus 400 calculates the correspondence relation representing the position in which each pixel of each camera image is projected on the stereoscopic projection plane, and generates the projection data table illustrated in FIG. 9. However, the image processing apparatus 400 does not need to necessarily include the table generating unit 410. For example, the projection data table may be generated in advance using an external information processing apparatus, and the image processing apparatus 400 may generate an omnidirectional image using the projection data table generated by the information processing apparatus.

[b] Second Embodiment

Meanwhile, for the purpose of vehicle driving assistance, for example, there have been known many techniques of providing an image on which a guide line for assisting a driving operation is rendered, which is obtained by capturing an area around a vehicle, to be provided to the user. However, the related arts have a common problem in that a range to render a guide line is narrow. For example, in an overhead view image obtained by capturing an area around a vehicle, a guide line is not rendered in a range exceeding a point of view of a single camera. In an omnidirectional image of the related art obtained by capturing an area around the vehicle, an area around the vehicle is not necessarily shown in a vivid state due to the influence of the parallax between the camera images. For this reason, in the related art, a guide line is rendered in a limited range in which the user can understand a relative relation between a vehicle and a surrounding object.

In the first embodiment, the omnidirectional image in which the influence of the parallax between the camera images is reduced can be generated, and thus the user can be provided with an omnidirectional image in which an area around a vehicle is vividly shown in a range broader than that of an omnidirectional image of the related art. For this reason, there is a possibility that a range to render a guide line in an omnidirectional image can be increased. In this regard, the following second embodiment will be described in connection with an example in which a guide line is rendered to overlap an omnidirectional image generated in the first embodiment.

Figure 11:
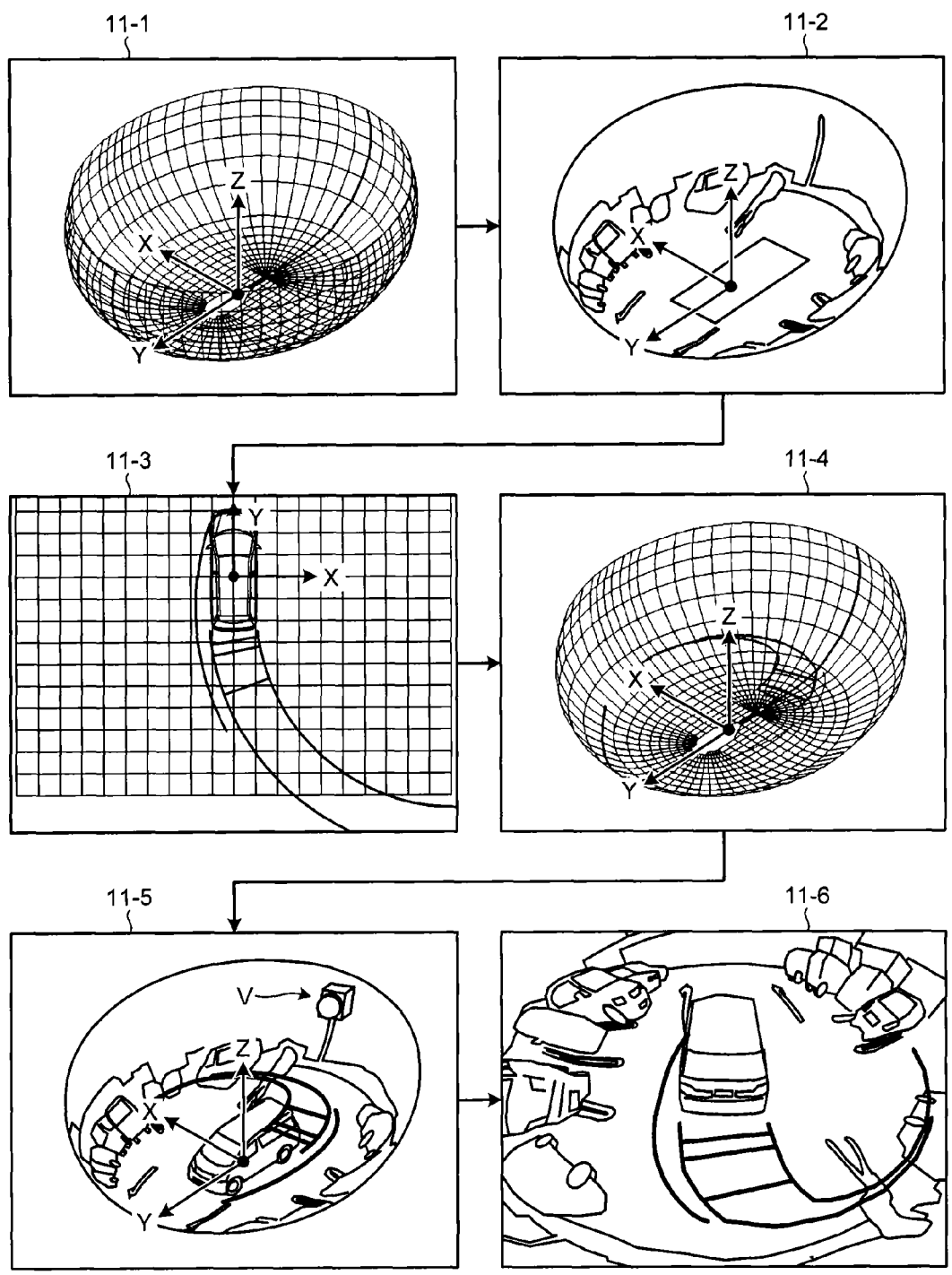
FIG. 11 is a diagram illustrating an outline until an omnidirectional image in which a guide line is rendered is displayed.

FIG. 11 is a diagram illustrating an outline until an omnidirectional image in which a guide line is rendered is displayed. The process proceeds in the order of 11-1 to 11-6 illustrated in FIGS. 11. 11-1 to 11-2 are executed by the image processing apparatus described in the first embodiment, and 11-3 to 11-6 are executed by the image processing apparatus described in the second embodiment. As illustrated in 11-1 to 11-2, an omnidirectional image is rendered using the stereoscopic projection plane. Next, as illustrated in 11-3 to 11-4, a generated guide line is projected on the stereoscopic projection plane. Then, when a point of view V is decided as illustrated in 11-5, an omnidirectional image in which a guide line is rendered is displayed as illustrated in 11-6.

Configuration of Image Processing Apparatus (Second Embodiment)

Figure 12:
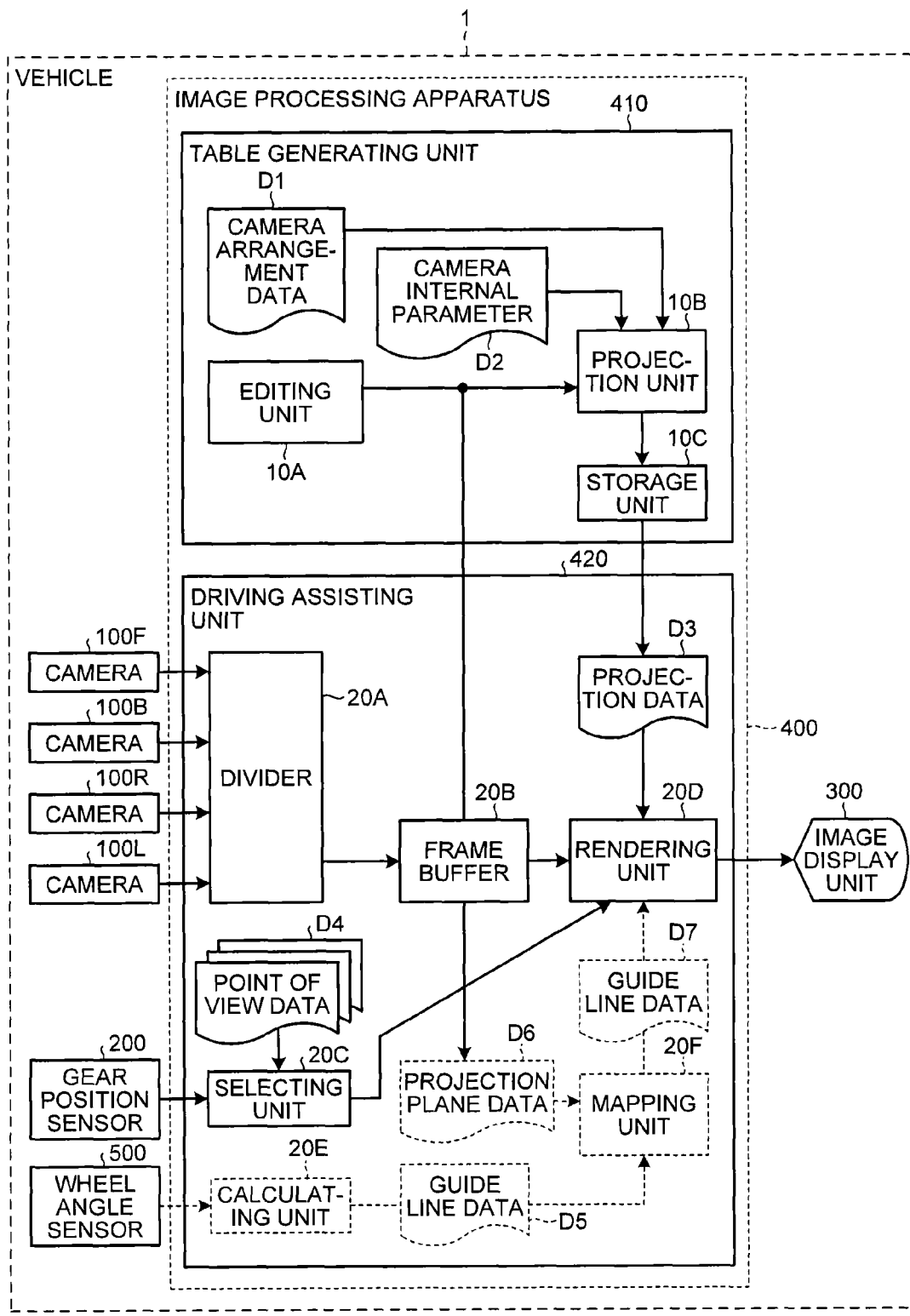
FIG. 12 is a functional block diagram illustrating a configuration of an image processing apparatus according to a second embodiment.

FIG. 12 is a functional block diagram illustrating a configuration of an image processing apparatus according to the second embodiment. The second embodiment is different from the first embodiment in that a wheel angle sensor 500 is mounted in the vehicle 1. In addition, the image processing apparatus 400 according to the second embodiment is different from the first embodiment in that a driving assisting unit 420 includes a calculating unit 20E and a mapping unit 20F.

The wheel angle sensor 500 sequentially acquires information of a wheel angle θ of the vehicle 1, and transfers the acquired information of the wheel angle θ to the calculating unit 20E.

Figures 13, 14:
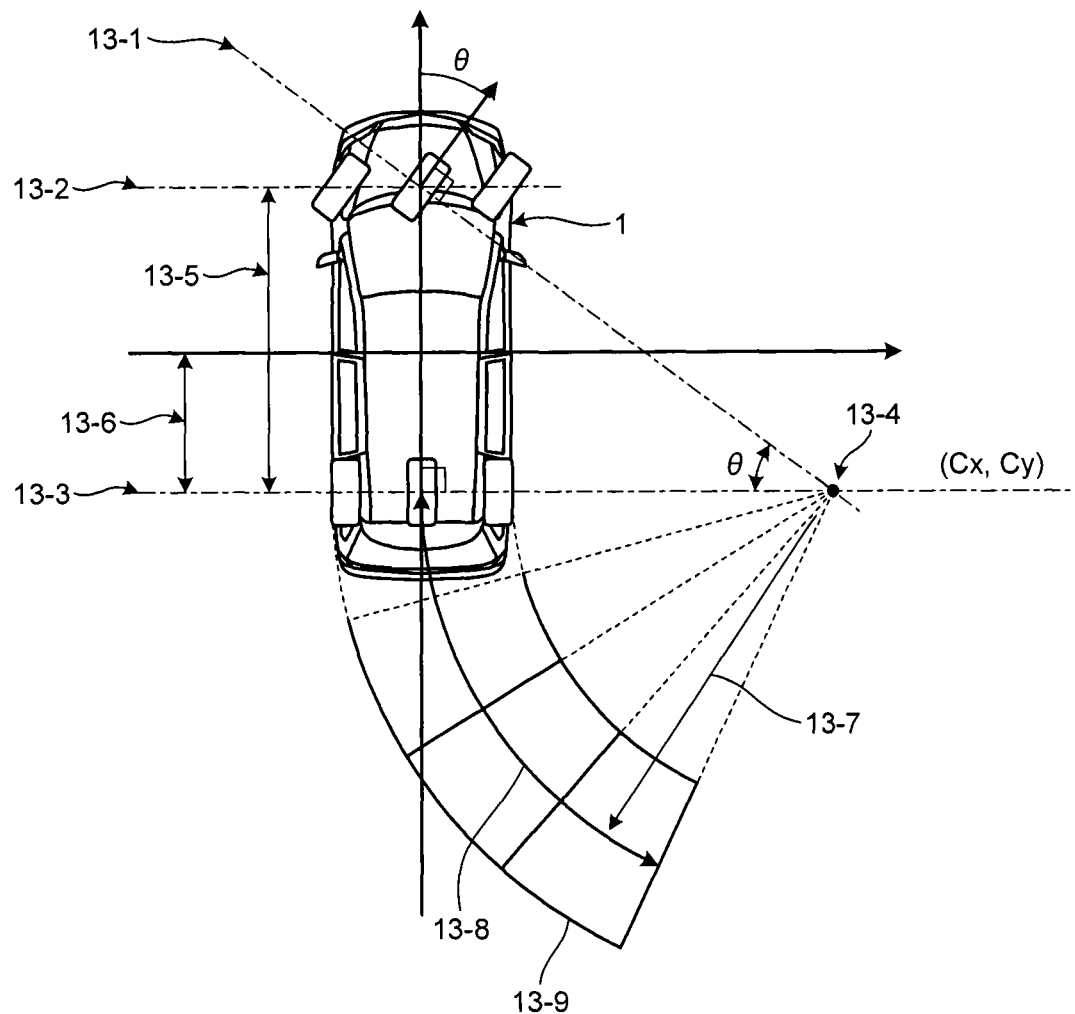
FIG. 13 is a diagram illustrating a two-wheel vehicle model used in the second embodiment.
FIG. 14 is a diagram illustrating an example of a guide line data format according to the second embodiment.

The calculating unit 20E calculates an anticipated trajectory line corresponding to an anticipated path of the vehicle 1 using a two-wheel vehicle model based on the information of the wheel angle θ transferred from the wheel angle sensor 500 and the vehicle geometry, and decides the shape of a guide line including the anticipated trajectory line. FIG. 13 is a diagram illustrating a two-wheel vehicle model used in the second embodiment. 13-1 illustrated in FIG. 13 represents a front-wheel rotational axis when the vehicle 1 pivots. 13-2 illustrated in FIG. 13 represents a front-wheel rotational axis when the vehicle 1 moves forward. θ illustrated in FIG. 13 represents a wheel angle. 13-3 illustrated in FIG. 13 represents a rear-wheel rotational axis of the vehicle 1. 13-4 illustrated in FIG. 13 represents a pivot center of the vehicle 1. 13-5 illustrated in FIG. 13 represents a wheel base of the vehicle 1. 13-6 illustrated in FIG. 13 represents a rear-wheel offset of the vehicle 1. 13-7 illustrated in FIG. 13 represents a radius of rotation when the vehicle 1 pivots. 13-8 illustrated in FIG. 13 represents an anticipated trajectory line when the vehicle 1 moves backward. 13-9 illustrated in FIG. 13 represents a guide line. For example, the wheel base represented by 13-5 and the rear-wheel offset represented by 13-6 correspond to the vehicle geometry.

As illustrated in FIG. 13, the calculating unit 20E uses a virtual two-wheel vehicle model that includes a wheel of a wheel angle θ between the left and right front wheels of the vehicle 1 and a wheel between the left and right rear wheels, and the pivot center of the vehicle is present at the position of an intersection point of lines extended from the wheel axes. Here, the calculating unit 20E uses a condition that sliding of a wheel is ignored, and two wheels of the two-wheel vehicle model move vertically to a wheel axis as a precondition. For example, when the vehicle 1 moves backward, the anticipated trajectory calculating unit 20E can calculate an anticipated trajectory line in the vehicle coordinate system by drawing an arc, centering on the pivot center, starting from left and right rear end positions of the vehicle 1.

For example, when coordinates of the pivot center of the vehicle 1 represented by 13-4 of FIG. 13 are "(Cx,Cy)" and a radius of rotation of the vehicle 1 represented by 13-4 of FIG. 13 is "R", "(Cx,Cy)" and "R" are represented by the following Formula (10):

$$Cx = \frac{Wb}{-\tan\theta}$$
$$Cy = -OffsetR$$
$$R = |Cx|$$
(10)

Then, the anticipated trajectory calculating unit 20E decides the shape of a guide line including the anticipated trajectory line, then approximates the guide line to a straight line, and defines the shape of the guide line by X coordinates and Y coordinates of both ends of each straight line. Then, for example, the anticipated trajectory calculating unit 20E stores guide line data defining the shape of the guide line in an internal memory or the like.

The calculating unit 20E re-calculates the anticipated trajectory line each time the information of the wheel angle θ transferred from the wheel angle sensor 500 is changed, redefines the shape of the guide line including the anticipated trajectory line, and updates the guide line data. For example, when the information of the wheel angle θ is transferred from the wheel angle sensor 500, the calculating unit 20E determines whether or not the information of the wheel angle θ has been changed. Then, when it is determined that the information of the wheel angle θ has been changed as a result of the determination, the calculating unit 20E re-calculates the anticipated trajectory line, re-decides the shape of the guide line, redefines the shape of the guide line including the anticipated trajectory line, and updates the guide line data.

FIG. 14 is a diagram illustrating an example of a guide line data format according to the second embodiment. For example, the anticipated trajectory calculating unit 20E stores guide line data in which a straight line ID "1", apex IDs "1" and "2", and a coordinate value (x1,y1) are associated with one another as illustrated in FIG. 14. The straight line ID is an identifier assigned to a straight line configuring the guide line, the apex ID is an identifier assigned to both ends of a straight line, and the coordinate value (X,Y) is a coordinate value of both ends of a straight line.

The mapping unit 20F will be described with reference back to FIG. 12. The mapping unit 20F generates guide line data D7 that is 3D guide line data by mapping the guide line on the stereoscopic projection plane with reference to guide line data D5 and projection plane data D6. The mapping unit 20F is an example of a third specifying unit.

Figures 15, 16:
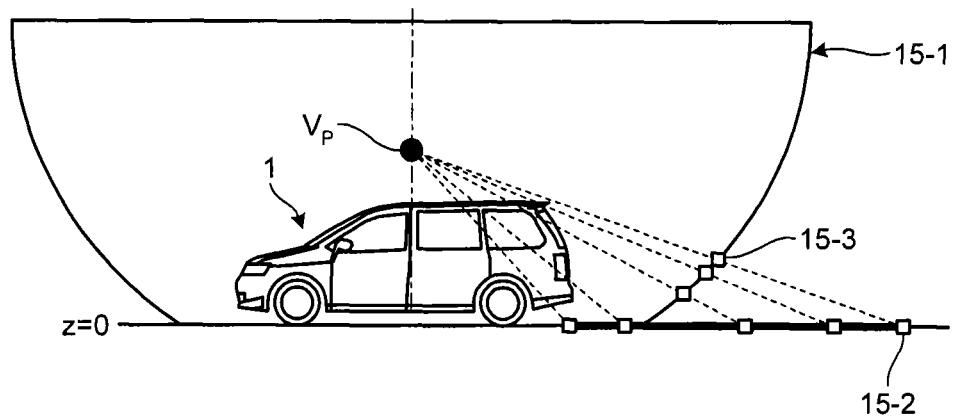
FIG. 15 is a diagram for describing mapping of a guide line on a stereoscopic projection plane according to the second embodiment.
FIG. 16 is a diagram illustrating an example of a 3D guide line data format according to the second embodiment.

For example, the mapping unit 20F obtains the position of an intersection point at which a line segment, which is obtained by connecting apex coordinates of the guide line described in the guide line data D5 with a virtual point of view at the time of execution of virtual point of view projection, intersects with the stereoscopic projection plane. The position of the intersection point becomes a 3D apex position of the guide line mapped on the stereoscopic projection plane. FIG. 15 is a diagram for describing mapping of a guide line on the stereoscopic projection plane according to the second embodiment. 15-1 illustrated in FIG. 15 represents the stereoscopic projection plane corresponding to the projection plane data D6. 15-2 illustrated in FIG. 15 represents the apex position of the guide line on the road plane surface. 15-2 may be the bottom surface of the virtual point of view projection plane represented by 4-1 of FIG. 4. 15-3 illustrated in FIG. 15 represents a 3D apex position of the guide line on the stereoscopic projection plane. For example, the mapping unit 20F obtains the position of an intersection point 15-3 at which a line segment, which is obtained by connecting a virtual point of view position Vp set by the projection unit 10B at the time of execution of the point of view projection with the apex position 15-2 of the guide line, intersects with the stereoscopic projection plane 15-1 as illustrated in FIG. 15. Then, the mapping unit 20F obtains 3D coordinates of the intersection point 15-3 and generates the 3D guide line data D7. For example, the mapping unit 20F stores the 3D guide line data D7 in an internal memory or the like.

FIG. 16 is a diagram illustrating an example of a 3D guide line data format according to the second embodiment. For example, the mapping unit 20F stores 3D guide line data in which a straight line ID "1", apex IDs "1" and "2", and coordinate values $(x_3,y_3,z_3)$ and $(x_4,y_4,z_4)$ are associated with one another as illustrated in FIG. 16.

The mapping unit 20F generates the 3D guide line data each time the calculating unit 20E changes the guide line data according to a change in the wheel angle θ.

The rendering unit 20D will be described with reference back to FIG. 12. The rendering unit 20D generates an omnidirectional image by performing polygon rendering, and then generates an omnidirectional video with a guide line by rendering a guide line as a 3D line in an overlapping manner with reference to the guide line data D7.

The rendering unit 20D performs re-rendering on the guide line overlapping the omnidirectional image each time the mapping unit 20F re-generates the 3D guide line data D7.

Process by Image Processing Apparatus (Second Embodiment)

Figure 17:
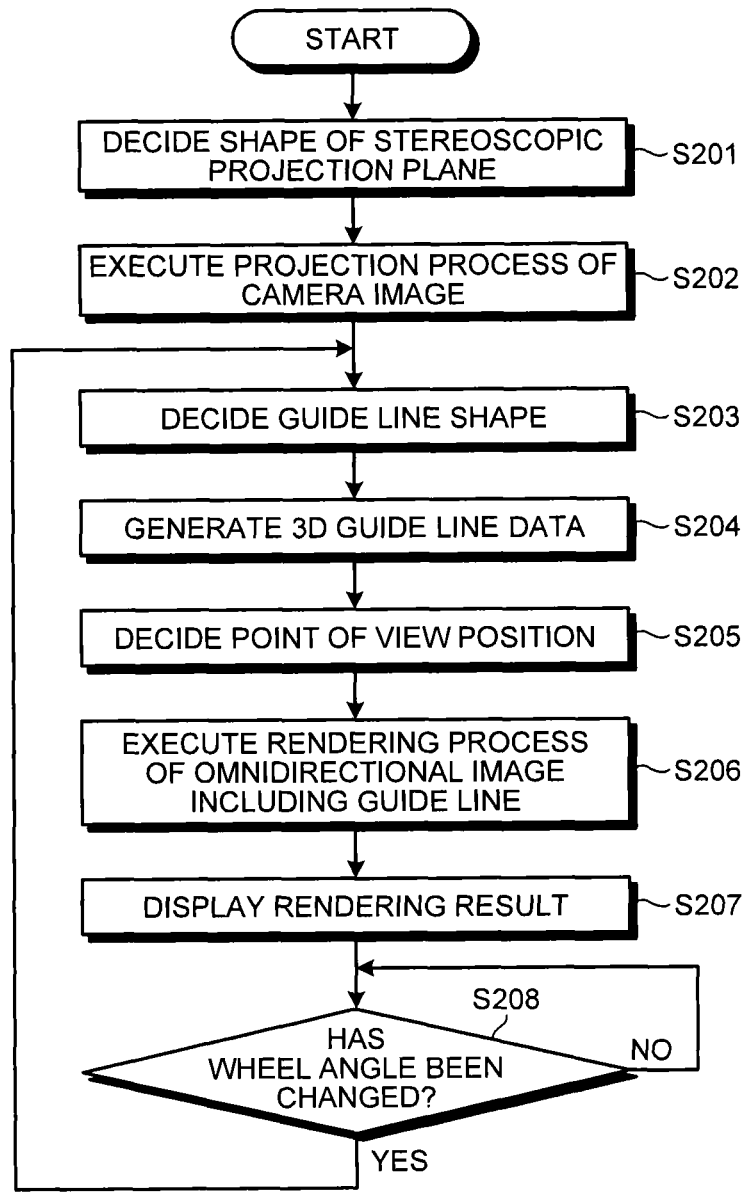
FIG. 17 is a diagram illustrating the flow of a process by an image processing apparatus according to the second embodiment.

FIG. 17 is a diagram illustrating the flow of a process by an image processing apparatus 400 according to the second embodiment. The process by the image processing apparatus according to the second embodiment is different from that according to the first embodiment in the process of steps S203, S204, S206, and S208 illustrated in FIG. 17.

In other words, the calculating unit 20E calculates an anticipated trajectory line corresponding to an anticipated path of the vehicle 1 using the two-wheel vehicle model or the like based on the information of the wheel angle θ transferred from the wheel angle sensor 500 and the vehicle geometry, and decides the shape of the guide line including the anticipated trajectory line (step S203). Next, the mapping unit 20F generates the 3D guide line data D7 by mapping the guide line on the stereoscopic projection plane with reference to the guide line data D5 and the projection plane data D6 (step S204).

Next, in step S205, the point of view position is decided by the selecting unit 20C, and the rendering unit 20D executes a process of rendering an omnidirectional image including a guide line (step S206). This rendering process corresponds to the above-described process of generating the omnidirectional video with the guide line by rendering the guide line as the 3D line in an overlapping manner with reference to the guide line data D7. Next, in step S207, the rendering result is displayed, and then the calculating unit 20E determines whether or not the information of the wheel angle θ has been changed (step S208). When it is determined that the information of the wheel angle θ has been changed (Yes in step S208), the calculating unit 20E causes the process to return to step S203, then re-calculates the anticipated trajectory line, and re-decides the shape of the guide line. Thereafter, the process of steps S204 to S208 is executed. However, when it is determined that the information of the wheel angle θ has not been changed (No in step S208), the calculating unit 20E repeats the same determination as step S208.

Effects by Second Embodiment

As described above, the image processing apparatus 400 according to the second embodiment provides the user with an image in which the guide line is rendered to overlap the omnidirectional image in which the influence of the parallax between the camera images is reduced. For this reason, according to the second embodiment, the range in which the guide line can be rendered can be increased, and the omnidirectional image that further contributes to the user's driving assistance can be provided to the user.

Further, according to the second embodiment, the position of the guide line changes according to the user's steering operation, and the omnidirectional image that the guide line whose position has been changed is rendered to be overlap is provided to the user, and thus the user's driving can be assisted in real time. For example, in the second embodiment, the guide line is mapped on the stereoscopic projection plane by the same virtual point of view projection as the omnidirectional video. For this reason, the guide line is rendered to overlap a white line of a road or the like present on an anticipate trajectory, and thus the user can check a path through which the vehicle passes when the steering operation is made in the form in which the path overlaps the omnidirectional image.

[c] Third Embodiment

The second embodiment has been described in connection with the example in which the mapping unit 20F maps the position of the guide line on the road plane surface with the 3D position on the stereoscopic projection plane using the guide line data D5 calculated by the calculating unit 20E, and obtains the 3D guide line data D7 by a calculation. However, the present invention is not limited to this example. For example, a table describing 3D coordinates, on the stereoscopic projection plane, corresponding to coordinates of a discrete representative point set on the road plane surface is generated in advance. Then, the 3D guide line data may be obtained by performing an interpolation calculation on the 3D position on the stereoscopic projection plane corresponding to the position of the guide line on the road plane surface using this table.

Configuration of Image Processing Apparatus (Third Embodiment)

Figure 18:
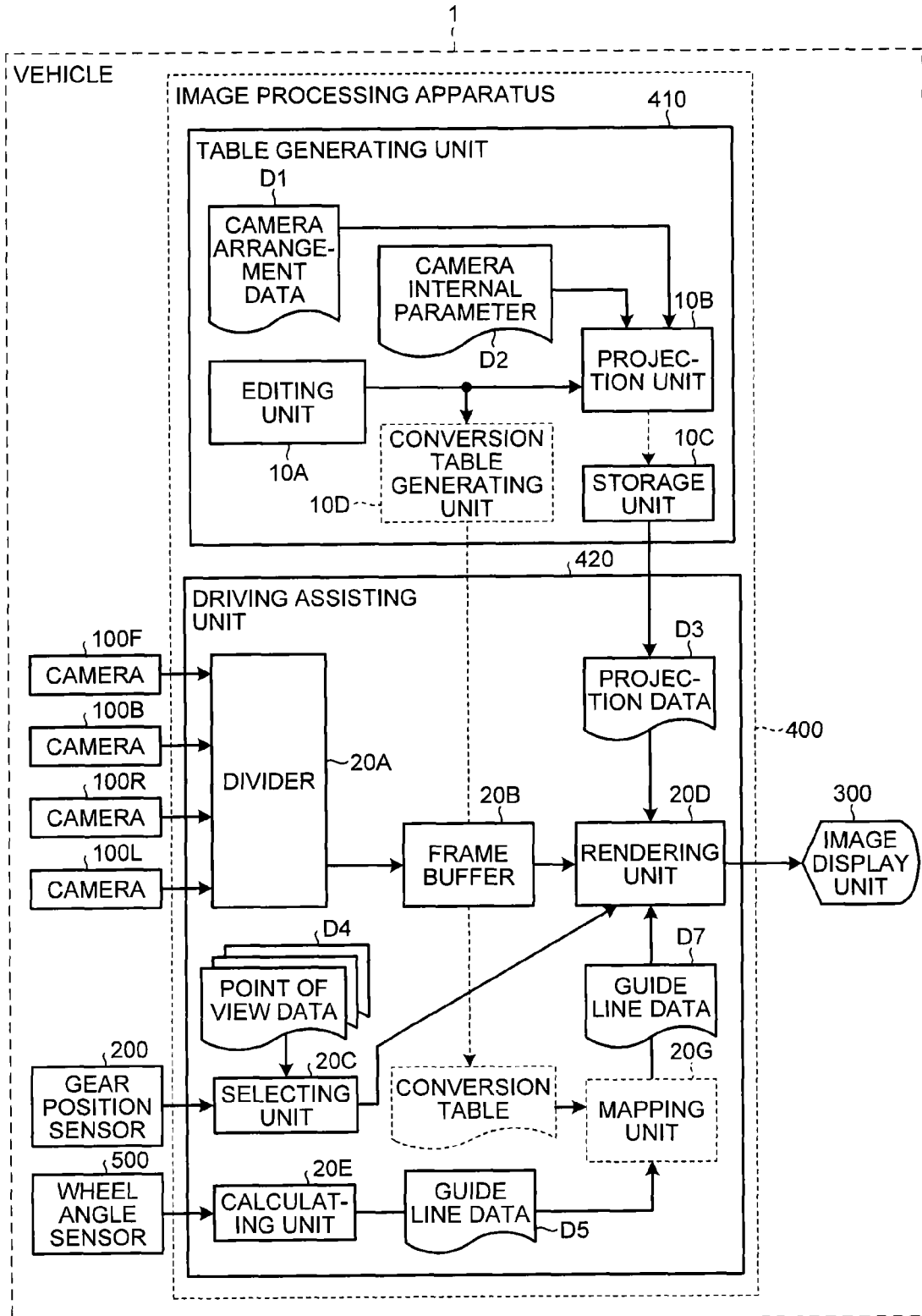
FIG. 18 is a functional block diagram illustrating a configuration of an image processing apparatus according to a third embodiment.

FIG. 18 is a functional block diagram illustrating a configuration of an image processing apparatus according to a third embodiment. An image processing apparatus 400 according to the third embodiment is different from that according to the second embodiment in that the table generating unit 410 includes a conversion table generating unit 10D. In addition, the image processing apparatus 400 according to the third embodiment is different from that according to the second embodiment in that the driving assisting unit 420 includes a mapping unit 20G.

Figures 19, 20:
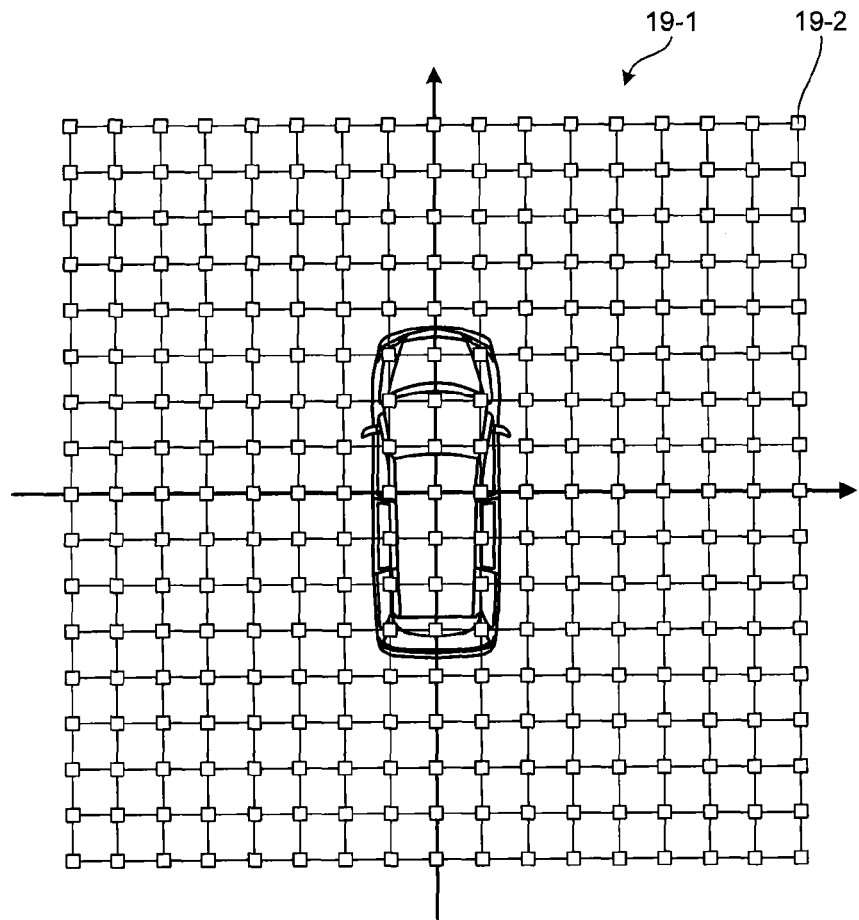
FIG. 19 is a diagram illustrating an example of a discrete representative point on a road plane surface.
FIG. 20 is a diagram illustrating an example of a data format described in a conversion table according to the third embodiment.

The conversion table generating unit 10D generates a table used to obtain the 3D coordinates on the stereoscopic projection plane corresponding to the coordinates of the discrete representative point on the road plane surface in advance. FIG. 19 is a diagram illustrating an example of the discrete representative point on the road plane surface. 19-1 illustrated in FIG. 19 represents the road plane surface, and 19-2 illustrated in FIG. 19 represents the representative point set on the road plane surface. For example, the conversion table generating unit 10D calculates the 3D coordinates on the stereoscopic projection plane corresponding to each representative point represented by 19-2 of FIG. 19 using the virtual point of view projection. Then, the conversion table generating unit 10D generates a conversion table in which the coordinates of the discrete representative point on the road plane surface are associated with the corresponding 3D coordinates on the stereoscopic projection plane, and stores the conversion table in an internal memory.

FIG. 20 is a diagram illustrating an example of a data format described in the conversion table according to the third embodiment. As illustrated in FIG. 20, the conversion table generating unit 10D stores the conversion table in which the coordinates of the discrete representative point on the road plane surface are associated with the corresponding 3D coordinates on the stereoscopic projection plane. For example, the conversion table generating unit 10D stores a conversion table in which a representative point ID "1", coordinate value $(x_5, y_5)$ on the road plane surface, and a 3D coordinate value $(x_6, y_6, z_6)$ are associated with one another. The representative point ID is an identifier assigned to the representative point, the coordinate value on the road plane surface is a coordinate value of the representative point on the road plane surface, and the 3D coordinate value is a 3D coordinate value on the stereoscopic projection plane corresponding to the representative point.

The mapping unit 20G will be described with reference back to FIG. 18. The mapping unit 20G obtains the 3D coordinates on the stereoscopic projection plane corresponding to the apex coordinates of the guide line included in guide line data 5D by an interpolation calculation using the conversion table. Then, the mapping unit 20G generates and stores the 3D guide line data D7.

Then, the rendering unit 20D performs the 3D coordinates conversion process with reference to the 3D guide line data D7 in real time, converts the 3D guide line according to a change in an anticipate path of the vehicle 1, and renders the 3D guide line at the same time as rendering of the stereoscopic projection plane.

According to the third embodiment, the position of the guide line on the road plane surface is mapped to the 3D position on the stereoscopic projection plane, and the 3D guide line data D7 can be obtained with a processing load smaller than the case of obtaining the 3D guide line data D7 by a calculation.

In addition, in the third embodiment, an intersection point of straight lines forming an orthogonal cross grid pattern is used as the representative point as illustrated in FIG. 19, but any pattern may be employed as long as a range of rendering a guide line is covered. Furthermore, the conversion table in which the coordinates of the discrete representative point on the road plane surface are associated with the corresponding 3D coordinates on the stereoscopic projection plane is generated as illustrated in FIG. 20, and the table may be generated using other parameters as long as the coordinates are derived.

[d] Fourth Embodiment

The third embodiment has been described in connection with the example in which the table describing the 3D coordinates on the stereoscopic projection plane corresponding to the coordinates of the discrete representative point set on the road plane surface is generated in advance. Here, for example, in the process of rendering the omnidirectional video, when the point of view position is a known fixed position, a table describing a screen coordinate value of a display screen corresponding to the coordinates of the discrete representative point set on the road plane surface other than the 3D coordinate value on the stereoscopic projection plane may be generated in advance. Then, the guide line may be rendered on the omnidirectional video based on the screen coordinate value of the display screen, that is, the coordinate value of the display image frame using the table.

Configuration of Image Processing Apparatus (Fourth Embodiment)

Figure 21:
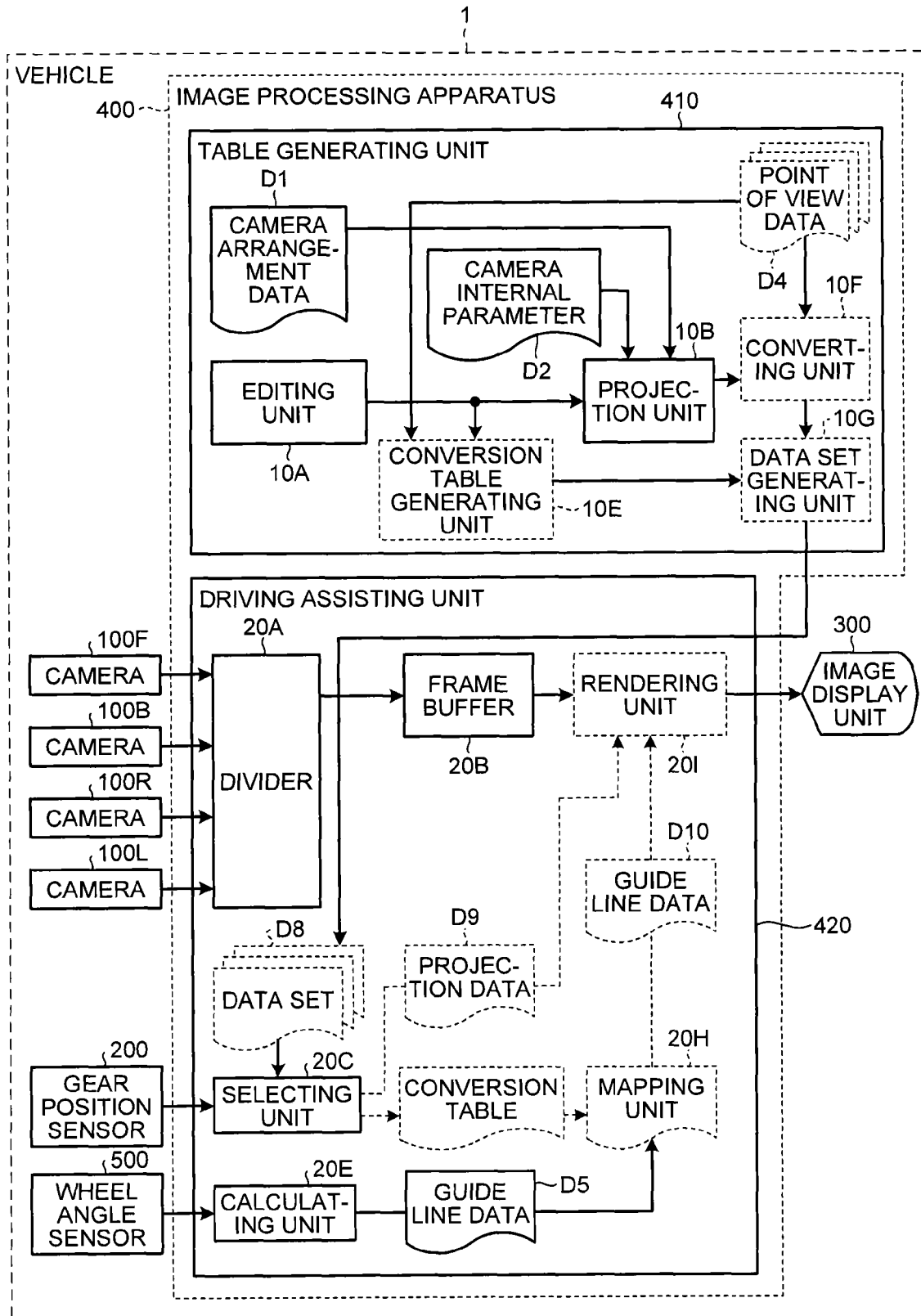
FIG. 21 is a functional block diagram illustrating a configuration of an image processing apparatus according to a fourth embodiment.

FIG. 21 is a functional block diagram illustrating a configuration of an image processing apparatus according to a fourth embodiment. An image processing apparatus 400 according to the fourth embodiment is different from that according to the third embodiment in that the table generating unit 410 includes a conversion table generating unit 10E, a converting unit 10F, and a data set generating unit 10G. In addition, the image processing apparatus 400 according to the fourth embodiment is different from that according to the third embodiment in that the driving assisting unit 420 includes a mapping unit 20H and a rendering unit 20I.

Figures 22, 23:
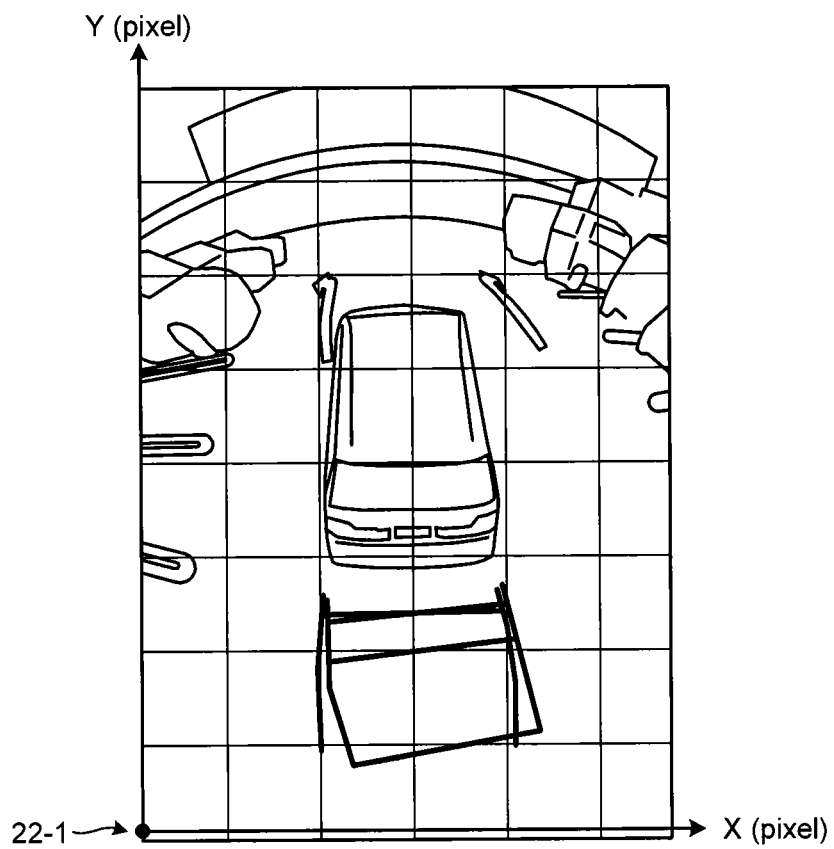
FIG. 22 is a diagram for describing a screen coordinate system.
FIG. 23 is a diagram illustrating an example of a data format described in a conversion table according to the fourth embodiment.

The conversion table generating unit 10E generates a table used to obtain the screen coordinate value of the display screen corresponding to the coordinates on the road plane surface. FIG. 22 is a diagram for describing a screen coordinate system. As illustrated in FIG. 22, the screen coordinate system is a coordinate system in which a lower left of an area of a display screen for displaying the omnidirectional video is used as an original point 22-1, and a horizontal direction is used as an X axis, and a vertical direction is used as a Y axis. The conversion table generating unit 10E converts the coordinates of the representative point on the road plane surface into the 3D coordinates on the stereoscopic projection plane. Next, the conversion table generating unit 10E projects corresponding 3D coordinates on the screen coordinate system at the point of view position based on a point of view data D4 using a 3D graphics process, and obtains the screen coordinate value corresponding to the 3D coordinates. Then, the conversion table generating unit 10E generates and stores a conversion table in which the coordinate value on the road plane surface is associated with the corresponding screen coordinate value of the display screen. The conversion table generating unit 10E generates the conversion table for each point of view corresponding to each point of view data D4.

FIG. 23 is a diagram illustrating an example of a data format described in the conversion table according to the fourth embodiment. As illustrated in FIG. 23, the conversion table generating unit 10E stores a conversion table in which the coordinates on the road plane surface are associated with the corresponding screen coordinates of the display screen. For example, the conversion table generating unit 10E stores a conversion table in which a representative point ID "1", a coordinate value $(x_7, y_7)$ on the road plane surface, and a screen coordinate value $(x_8, y_8)$ are associated with one another.

The converting unit 10F generates projection data D9 in which projection data generated by the projection unit 10B is projected on the screen coordinate system at the point of view position based on the point of view data D4. Here, the converting unit 10F may generate the projection data in which the projection data generated by the projection unit 10B is projected on the screen coordinate system for each point of view position in advance, and may store the table describing the projection data of each point of view position. The converting unit 10F generates the projection data D9 for each point of view position based on the point of view data D4.

The data set generating unit 10G generates and stores a data set D8 in which the conversion table generated by the conversion table generating unit 10E is combined with the projection data D9 generated by converting unit 10F. The data set D8 is an example of a table stored in a table storage unit.

The selecting unit 20C acquires the projection data D9 corresponding to the decided point of view position from the data set D8, and transfers the acquired projection data D9 to the rendering unit 20I. Further, the selecting unit 20C transfers the conversion table corresponding to the decided point of view position to the mapping unit 20H.

The mapping unit 20H obtains the screen coordinate value corresponding to the apex coordinates of the guide line included in the guide line data D5 with reference to the conversion table transferred from the selecting unit 20C. Then, the mapping unit 20H generates and stores guide line data D10 including the screen coordinate value corresponding to the apex coordinates of the guide line.

The rendering unit 20I performs a screen coordinate conversion process with reference to the projection data D9 and the guide line data D10 in real time. Then, the rendering unit 20I renders the omnidirectional image in the screen coordinate system using the projection data D9 according to a change in the anticipate path of the vehicle 1, and then renders the guide line in the screen coordinate system in an overlapping manner.

According to the fourth embodiment, since the data set D8 is generated for each point of view position, when the point of view position is known, the process of rendering the omnidirectional image can be rapidly executed.

As illustrated in FIG. 23, the conversion table in which the coordinates on the road plane surface are associated with the corresponding screen coordinates of the display screen is generated, but the table may be generated using other parameters as long as the coordinates are derived.

[e] Fifth Embodiment

Hereinafter, another embodiment of an image processing apparatus and an image processing program according to the present disclosure will be described.

(1) Rendering of Omnidirectional Image by Direct Projection

The above embodiments have been described in connection with the example in which the omnidirectional image is generated using the correspondence relation such that the position of the stereoscopic projection plane is associated with the position on each camera image projected to the position by the virtual point of view projection. Here, for example, the omnidirectional image may be generated using a correspondence relation obtained by direct projection of projecting directly on the stereoscopic projection plane rather than the position of the camera instead of the virtual point of view projection. Hereinafter, the description will proceed with reference to FIG. 24. 24-1 of FIG. 24 represents the stereoscopic projection plane.

Figure 24:
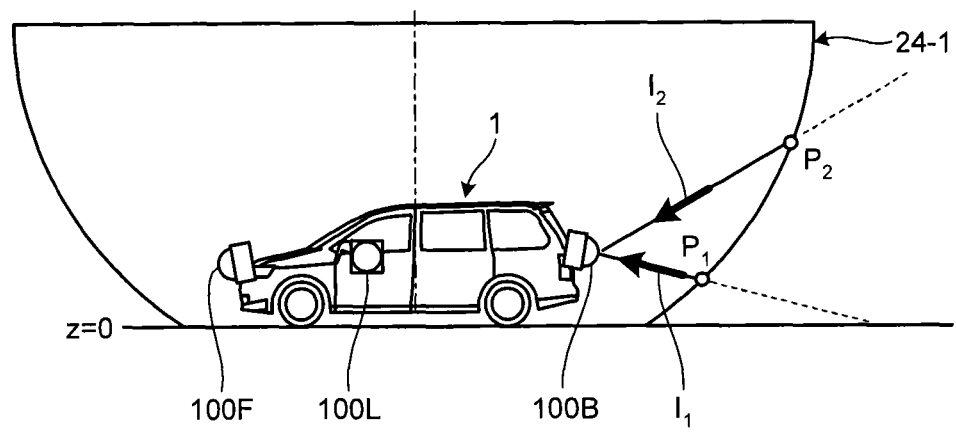
FIG. 24 is a diagram for describing a method of obtaining a correspondence relation by direct projection.

FIG. 24 is a diagram for describing a method of obtaining the correspondence relation by the direct projection. For example, the projection unit 10B regards vectors that are directed from apexes $P_1$ and $P_2$ of a polygon on the stereoscopic projection plane toward the camera 100B as incident light vectors "$I_1$" and "$I_2$" as illustrated in FIG. 24. Next, the projection unit 10B decides image coordinate values "$Q_1$" and "$Q_2$" of the camera 100B in which the incident light vectors are projected by the same method as in the first embodiment. Next, the projection unit 10B obtains a correspondence relation in which coordinates of the apexes $P_1$ and $P_2$ of the polygon on the stereoscopic projection plane are associated with the image coordinate value of the camera 100B. The projection unit 10B processes each camera image in the same manner and generates, for example, the correspondence relation illustrated in FIG. 9. Then, the projection unit 10B renders the omnidirectional image based on the correspondence relation. As the omnidirectional image is rendered using the correspondence relation obtained by the direct projection as described above, the omnidirectional image in which an image to be generated is less affected by the parallax between the camera images in a portion that can be approximated to the road plane surface around the vehicle can be generated. Here, the projection unit 10B is an example of a pixel position specifying unit.

(2) Rendering of Guide Line by Direct Projection

The above embodiments have been described in connection with the example in which the 3D guide line data D7 illustrated in FIG. 16 is generated using the virtual point of view projection illustrated in FIG. 15, and the guide line is rendered based on the 3D guide line data D7. Here, for example, the guide line may be rendered by the direct projection. Next, the description will proceed with reference to FIG. 25. 25-1 of FIG. 25 represents the stereoscopic projection plane.

Figure 25:
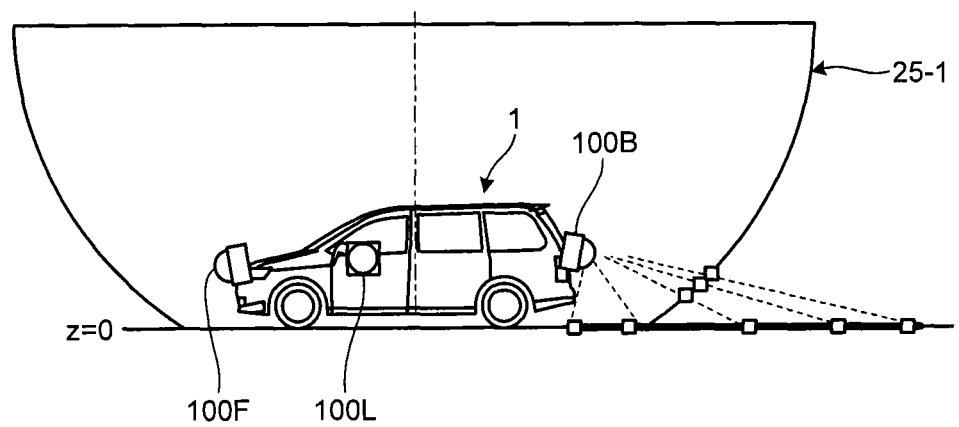
FIG. 25 is a diagram for describing a method of obtaining a 3D guide line data by direct projection.

FIG. 25 is a diagram for describing a method of obtaining the 3D guide line data by the direct projection. For example, when both apex coordinates of a line segment forming a guide line are included within an imaging range of the camera 100B, the mapping unit 20F obtains a line segment obtained by connecting the apex of the guide line included in the line segment with the position of the corresponding camera 100B as illustrated in FIG. 25. Next, the mapping unit 20F maps an apex of a 3D guide line at the position of the intersection point at which the line segment illustrated in FIG. 25 intersects with the stereoscopic projection plane 25-1, and obtains coordinates of the intersection point. The mapping unit 20F performs mapping on each apex of the guide line, and generates, for example, the 3D guide line data illustrated in FIG. 16. Then, the mapping unit 20F renders the guide line to overlap the omnidirectional image generated by the above-described method (1) based on the 3D guide line data. As the guide line is rendered by the direct projection as described above, the guide line can be rendered in a broader range which is more useful to the user's vehicle driving assistance than the case in which the guide line is rendered on the overhead view image in which all areas around the vehicle are looked down. Here, the mapping unit 20F is an example of a guide line position specifying unit.

(3) Apparatus Configuration

For example, the configuration of the functional blocks of the image processing apparatus 400 illustrated in FIG. 1 are conceptual, and need not have the physical configuration illustrated in the drawings. For example, the table generating unit 410 and the driving assisting unit 420 illustrated in FIG. 1 may be functionally or physically integrated. As described above, all or some of the functional blocks of the image processing apparatus 400 may be functionally or physically dispersed or integrated in arbitrary units according to various kinds of loads, use states, or the like.

(4) Image Processing Program

For example, various kinds of processes executed by the image processing apparatus 400 described in the above embodiments can be implemented by executing a predetermined program through an electronic device such as a microcomputer installed in an electronic control unit (ECU) mounted in the vehicle 1.

Figure 26:
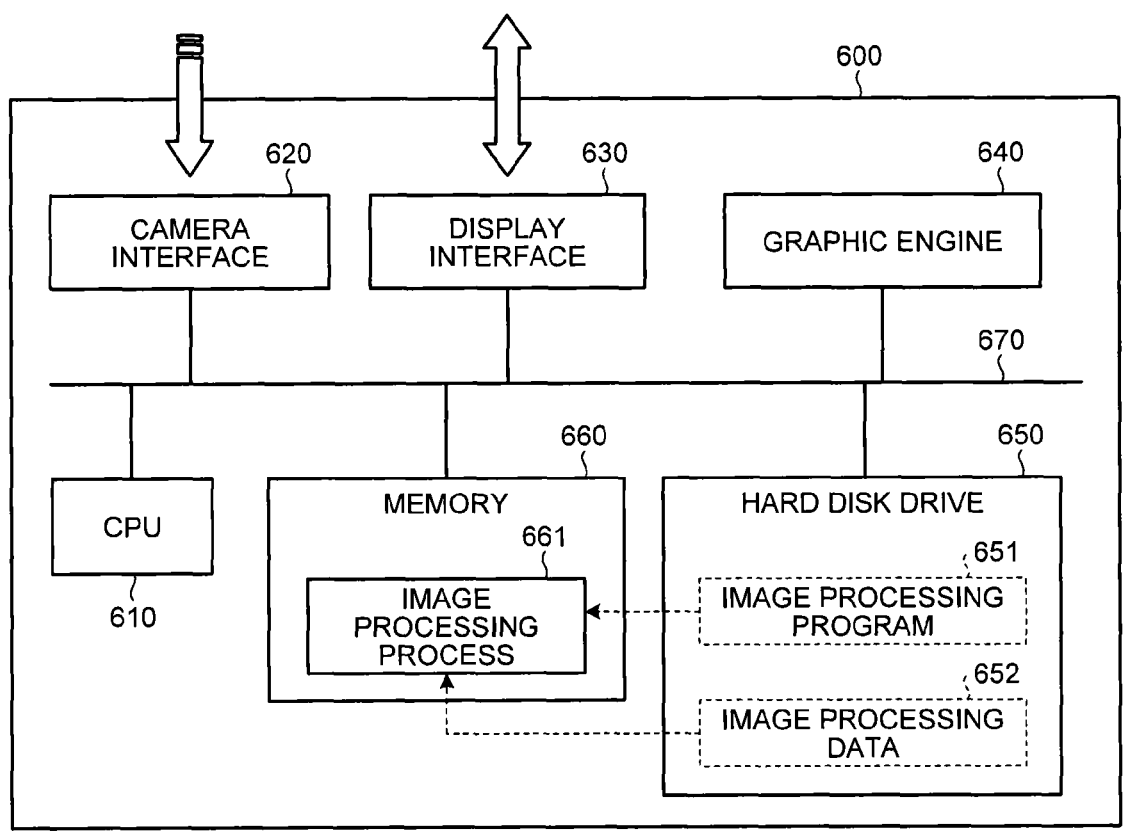
FIG. 26 is a diagram illustrating an example of an electronic device that executes an image processing program.
Figure 27:
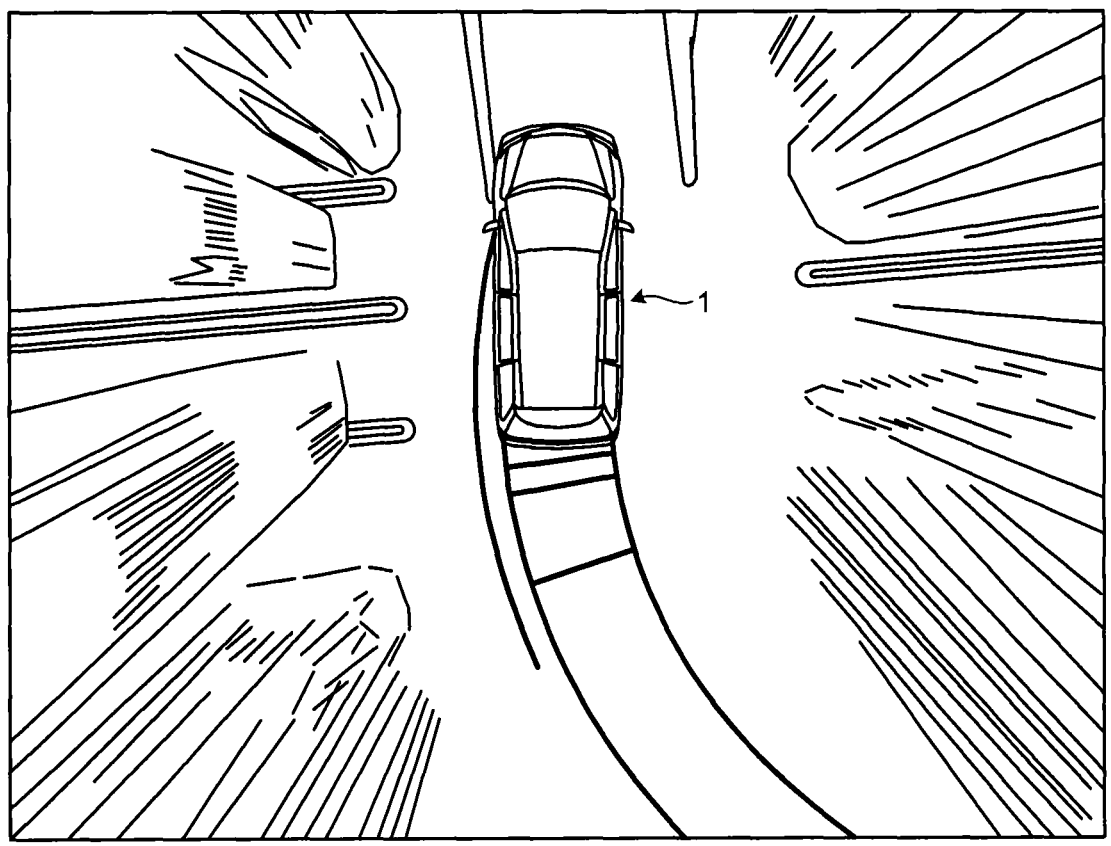
FIG. 27 is a diagram illustrating an example of an overhead view image in which all areas around a vehicle are looked down.

Hereinafter, an example of an electronic device that executes an image processing program of implementing the same function as the process executed by the image processing apparatus 400 described in the above embodiment will be described with reference to FIG. 26. FIG. 26 is a diagram illustrating an example of an electronic device that executes an image processing program.

An electronic device 600 that implements various kinds of processes executed by the image processing apparatus 400 includes a central processing unit (CPU) 610 that executes various kinds of calculation processes as illustrated in FIG. 26. The electronic device 600 further includes a camera interface 620 that acquires a camera image and a display interface 630 that exchanges various kinds of data with a display device as illustrated in FIG. 26. The electronic device 600 further includes a graphic engine 640 that functions as a hardware accelerator that synthesizes a camera image as illustrated in FIG. 26.

The electronic device 600 further includes a hard disk drive 650 that stores, for example, a program and data used to implement various kinds of processes by the CPU 610, and a memory 660 such as a Random Access Memory (RAM) that temporarily stores various kinds of information as illustrated in FIG. 26. The devices 610 to 660 are connected to a bus 670.

Instead of the CPU 610, for example, an electronic circuit such as a micro processing unit (MPU), an integrated circuit such as an application specific integrated circuit (ASIC) or a field programmable gate array (FPGA), or the like may be used. Instead of the memory 660, a semiconductor memory device such as a flash memory may be used.

The hard disk drive 650 stores an image processing program 651 that performs the same function as the function of the image processing apparatus 400 and an image processing data 652. The image processing program 651 may be appropriately dispersed and stored in a storage unit of another computer connected to perform communication via a network.

The CPU 610 reads the image processing program 651 from the hard disk drive 650 and develops the image processing program 651 in the RAM 660, and so the image processing program 651 functions as an image processing process 661 as illustrated in FIG. 26. The image processing process 661 develops various kinds of data such as the image processing data 652 read from the hard disk drive 650 in an area of the memory 660 assigned to itself, and executes various kinds of processes based on the various kinds of developed data.

For example, the image processing process 661 includes a process that is executed by the table generating unit 410 or the driving assisting unit 420 of the image processing apparatus 400 illustrated in FIG. 1.

The image processing program 651 does not need to be stored in the hard disk drive 650 from the beginning. For example, each program may be stored in "a portable physical medium" such as a flexible disk (FD), a compact disc read only memory (CD-ROM), a digital versatile disc (DVD), a magneto-optical disk, or an IC card in which a corresponding drive can be connected to an ECU mounted in the electronic device 600. Then, each program may be read from the portable physical medium and executed by the electronic device 600.

Furthermore, each program may be stored in "another computer (or server)" or the like connected to an ECU mounted in the electronic device 600 via a public line, the Internet, a local area network (LAN), a wide area network (WAN), or the like. Then, each program may be read from another computer (or server) and executed by the electronic device 600.

According to an aspect of the technique of the present disclosure, it is possible to generate an omnidirectional image in which influence of parallax between cameras mounted in a vehicle is reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus, comprising:
   a memory; and
   a processor coupled to the memory, wherein the processor executes a process comprising:
   acquiring camera images, respectively, captured by a plurality of cameras which are mounted in a vehicle and have partially overlapping subject regions;
   specifying a position of each pixel of an image lower than a horizontal line obtained from an installation position and an angle of a camera among the acquired camera images on a bottom surface of a virtual projection plane that is a hemisphere of an infinite circle with a planar bottom surface, and specifying a position of each pixel of an image higher than the horizontal line among the acquired camera images on a hemisphere surface of the virtual projection plane;
   specifying a position of a pixel of each camera images specified on the virtual projection plane on a stereoscopic projection plane having a stereoscopic shape having a position of the vehicle as a center, the stereoscopic projection plane approximating a road plane surface in an area around the vehicle and increasing a gradient as the distance from the vehicle increases; and
   specifying each position on an image frame corresponding to the position of the pixel of each camera images specified on the stereoscopic projection plane based on a predetermined point of view position and rendering a value of a pixel of a corresponding camera images at each specified position.

2. The image processing apparatus according to claim 1, the process further comprising
   specifying a position of a guide line calculated based on an angle of a wheel of the vehicle on the stereoscopic projection plane,
   wherein the rendering includes specifying each position on an image frame corresponding to the position of the guide line specified on the stereoscopic projection plane, and rendering the guide line based on each specified position.

3. The image processing apparatus according to claim 2,
   wherein the number of predetermined point of view positions is two or more,
   the memory stores a table in which the position of the guide line specified on the stereoscopic projection plane is associated with the position on the image frame for each of the predetermined point of view positions, and
   the rendering includes specifying each position on the image frame corresponding to the position of the guide line specified on the stereoscopic projection plane based on the table corresponding to the predetermined point of view positions, and rendering the guide line based on each specified position.

4. An image processing apparatus, comprising:
   a memory; and a processor coupled to the memory, wherein the processor executes a process comprising:

acquiring camera images, respectively, captured by a plurality of cameras which are mounted in a vehicle and have partially overlapping subject regions;

specifying a position of a pixel of each of the camera images on a stereoscopic projection plane with a stereoscopic shape having a position of the vehicle as a center, the stereoscopic projection plane approximating a road plane surface in an area around the vehicle and increasing a gradient as the distance from the vehicle increases;

specifying a position of a guide line calculated based on an angle of a wheel of the vehicle on the stereoscopic projection plane; and specifying each position on an image frame corresponding to the position of the pixel of each of the camera images specified on the stereoscopic projection plane based on a predetermined point of view position, rendering a value of a pixel of a corresponding camera image at each specified position, specifying each position on the image frame corresponding to the position of the guide line specified on the stereoscopic projection plane, and rendering the guide line based on each specified position.

5. A non-transitory computer-readable recording medium having stored therein an image processing program that causes a computer to execute a process comprising:

acquiring camera images, respectively, captured by a plurality of cameras which are mounted in a vehicle and have partially overlapping subject regions;

specifying a position of each pixel of an image lower than a horizontal line obtained from an installation position and an angle of a camera among the acquired camera images on a bottom surface of a virtual projection plane that is a hemisphere of an infinite circle with a planar bottom surface, and specifying a position of each pixel of an image higher than the horizontal line among the acquired camera images on a hemisphere surface of the virtual projection plane;

specifying a position of a pixel of each camera images specified on the virtual projection plane on a stereoscopic projection plane having a stereoscopic shape having a position of the vehicle as a center, the stereoscopic projection plane approximating a road plane surface in an area around the vehicle and increasing a gradient as the distance from the vehicle increases; and specifying each position on an image frame corresponding to the position of the pixel of each camera images specified on the stereoscopic projection plane based on a predetermined point of view position and rendering a value of a pixel of a corresponding camera images at each specified position.

* * * * *

UNITED STATES PATENT AND TRADEMARK OFFICE
CERTIFICATE OF CORRECTION

| | | |
|---|---|---|
| PATENT NO. | : 8,817,079 B2 | Page 1 of 1 |
| APPLICATION NO. | : 13/752741 | |
| DATED | : August 26, 2014 | |
| INVENTOR(S) | : Seiya Shimizu | |

It is certified that error appears in the above-identified patent and that said Letters Patent is hereby corrected as shown below:

Title Page

Item [56] (Other Publications), Column 2, Line 3, Delete "Actione" and insert -- Action --, therefor.

Signed and Sealed this
Eighteenth Day of November, 2014

Michelle K. Lee
*Deputy Director of the United States Patent and Trademark Office*